(12) United States Patent
Rico Alvarino et al.

(10) Patent No.: US 12,069,750 B2
(45) Date of Patent: Aug. 20, 2024

(54) IN-BAND WIRELESS RELAY OPERATIONS

(71) Applicant: QUALCOMM Incorporated, San Diego, CA (US)

(72) Inventors: Alberto Rico Alvarino, San Diego, CA (US); Le Liu, Fremont, CA (US); Wanshi Chen, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 16/889,665

(22) Filed: Jun. 1, 2020

(65) Prior Publication Data

US 2020/0383149 A1 Dec. 3, 2020

Related U.S. Application Data

(60) Provisional application No. 62/856,509, filed on Jun. 3, 2019.

(51) Int. Cl.
*H04W 76/11* (2018.01)
*H04L 5/00* (2006.01)
(Continued)

(52) U.S. Cl.
CPC .......... *H04W 76/11* (2018.02); *H04L 5/0051* (2013.01); *H04L 5/10* (2013.01); *H04W 8/24* (2013.01);
(Continued)

(58) Field of Classification Search
None
See application file for complete search history.

(56) References Cited

U.S. PATENT DOCUMENTS 8,611,227 B2    12/2013  Gore et al.
10,075,930 B2 *  9/2018  Sorrentino ........ H04W 56/0025
(Continued)

FOREIGN PATENT DOCUMENTS

CN    106470493 A    3/2017
CN    109714781 A    5/2019
(Continued)

OTHER PUBLICATIONS

International Search Report and Written Opinion—PCT/US2020/035680—ISA/EPO—Dec. 21, 2020.
(Continued)

*Primary Examiner* — Scott M Sciacca
(74) *Attorney, Agent, or Firm* — Holland & Hart LLP

(57) ABSTRACT

Methods, systems, and devices for wireless communications are described. A relay node may establish a control plane connection between the relay node and a base station, wherein establishing the control plane connection comprises receiving from the base station a first network identifier for the relay node. The relay node may receive, via the control plane connection, a relay configuration from the base station. The relay node may monitor grants associated with a set of one or more user equipment (UEs) based at least in part on the relay configuration, each UE comprising a network identifier that is different from the first network identifier. The relay node may relay communications between the base station and the set of one or more UEs according to the monitoring.

28 Claims, 14 Drawing Sheets

(51) Int. Cl.
*H04L 5/10* (2006.01)
*H04W 8/24* (2009.01)
*H04W 24/08* (2009.01)
*H04W 24/10* (2009.01)
*H04W 72/23* (2023.01)
*H04W 72/56* (2023.01)
*H04W 74/08* (2024.01)
*H04W 74/0833* (2024.01)
*H04W 76/27* (2018.01)
*H04W 80/02* (2009.01)
*H04W 88/04* (2009.01)

(52) U.S. Cl.
CPC ........... *H04W 24/08* (2013.01); *H04W 24/10* (2013.01); *H04W 72/23* (2023.01); *H04W 72/56* (2023.01); *H04W 74/0833* (2013.01); *H04W 76/27* (2018.02); *H04W 80/02* (2013.01)

(56) References Cited

U.S. PATENT DOCUMENTS

| | | | |
|---|---|---|---|
| 2010/0002582 A1* | 1/2010 | Luft | H04W 74/0866 455/574 |
| 2010/0265842 A1 | 10/2010 | Khandekar et al. | |
| 2010/0302998 A1 | 12/2010 | Bao et al. | |
| 2011/0243060 A1 | 10/2011 | Mildh et al. | |
| 2012/0243430 A1* | 9/2012 | Song | H04L 1/0035 370/252 |
| 2012/0294228 A1 | 11/2012 | Song et al. | |
| 2013/0077543 A1 | 3/2013 | Kim et al. | |
| 2013/0315133 A1* | 11/2013 | Wang | H04W 40/22 370/315 |
| 2017/0265187 A1* | 9/2017 | Chen | H04W 76/14 |
| 2017/0325243 A1* | 11/2017 | Yasukawa | H04W 24/10 |
| 2017/0374575 A1 | 12/2017 | Kahtava et al. | |
| 2018/0027475 A1* | 1/2018 | Li | H04W 40/22 455/426.1 |
| 2019/0044754 A1* | 2/2019 | Hampel | H04B 7/2606 |
| 2019/0053087 A1 | 2/2019 | Callender et al. | |
| 2019/0215759 A1* | 7/2019 | Wei | H04W 74/00 |
| 2019/0239284 A1* | 8/2019 | Xu | H04W 76/11 |
| 2019/0280761 A1* | 9/2019 | Hu | H04W 76/14 |
| 2019/0379450 A1* | 12/2019 | Kamei | H04W 48/16 |
| 2020/0169956 A1* | 5/2020 | Sun | H04W 72/042 |
| 2021/0058820 A1* | 2/2021 | Lee | H04W 72/02 |
| 2021/0176820 A1* | 6/2021 | Zhang | H04W 8/005 |

FOREIGN PATENT DOCUMENTS

| | | |
|---|---|---|
| EP | 2217029 A1 | 8/2010 |
| EP | 2362704 A1 | 8/2011 |
| WO | WO-2010132488 | 11/2010 |
| WO | WO-2011097758 A1 | 8/2011 |
| WO | WO-2011101219 A1 | 8/2011 |
| WO | WO-2014205852 A1 | 12/2014 |

OTHER PUBLICATIONS

LG-NORTEL: "Control Channel Design for Relay Backhaul Link in FDM+TDM Scheme", 3GPP TSG RAN WG1 #59, 3GPP Draft; R1-094453 Control Channel Design for Relay Backhaul Link in FDM+TDM Scheme Vo.I, 3rd Generation Partnership Project (3GPP), Mobile Competence Centre ; 650, Route Des Lucioles ; F-06921 Sophia-Antipolis Cedex ; France, No. Jeju; Nov. 9, 2009, Nov. 9, 2009 (Nov. 9, 2009), 6 Pages, XP050388879, [retrieved on Nov. 2, 2009], Section 2.
Partial International Search Report—PCT/US2020/035680—ISA/EPO—Sep. 30, 2020.
European Search Report—EP23215986—Search Authority—Munich—Apr. 16, 2024.

* cited by examiner

IN-BAND WIRELESS RELAY OPERATIONS

CROSS REFERENCE

The present Application for Patent claims the benefit of U.S. Provisional Patent Application No. 62/856,509 by RICO ALVARINO et al., entitled "IN-BAND WIRELESS RELAY OPERATIONS," filed Jun. 3, 2019, assigned to the assignee hereof, and expressly incorporated by reference herein.

BACKGROUND

The following relates generally to wireless communications, and more specifically to in-band wireless relay operations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communication systems may use one or more relay nodes to forward wireless communications between a base station and a UE.

SUMMARY

The described techniques relate to improved methods, systems, devices, and apparatuses that support in-band wireless relay operations. Generally, the described techniques provide for techniques that ensure or otherwise improve wireless communications between a base station and user equipment (UE) involving one or more hops via relay nodes. Broadly, aspects of the described techniques may address establishment of a control plane connection between the base station and the relay node, identification of the set of UE(s) that the relay node may perform relay operations for, duplexing/general operations (e.g., prioritization), and the like, for such relay operations. For example, aspects of the described techniques may address issues such as whether the UE is aware of the relay operations being performed, channel performance measurement and reporting, and the like, with respect to relay operations within a wireless network.

In one example, a relay node (e.g., a UE acting as a relay node within the wireless network) may establish a control plane connection with the base station. For example, the relay node may, upon initialization, perform a random access channel (RACH) process with the base station to establish the control plane connection. Establishing the control plane connection may include the relay node receiving a first network identifier (e.g., a cell radio network temporary identifier (C-RNTI)) for the relay node. The relay node may receive a relay configuration from the base station, e.g., configuration information used for performing relay operations between the base station and UE(s). Accordingly, the relay node may monitor a control channel (e.g., physical downlink control channel (PDCCH), narrowband PDCCH (NPDCCH), etc.) for grants associated with the UE(s). Generally, the UE(s) that the relay node performs relay operations for may each be associated with their own unique network identifier (e.g., a second network identifier) that is different from the first network identifier of the relay node. The relay node may use the information indicated in received grants to perform relay operations (e.g., relaying uplink and/or downlink communications) between the base station and the UE(s).

In another example, a UE (e.g., a UE that may or may not be served by the relay operations performed by the relay node) may modify various channel performance measurement and reporting parameters based on relay communications being performed. For example, the UE may determine that relay communications are being performed, e.g., the UE may be configured for relay communications that the UE participates in and/or relay communications may be detected by the UE for neighboring UE(s)/relay node(s). Accordingly, the UE may determine the transmission schedule for the relay nodes performing relay transmissions on the channel. In some aspects, the relay communications may generally disrupt the channel performance within the wireless network, e.g., the sudden and possibly extensive transmissions over the channel may introduce additional congestion and/or interference on the channel. Accordingly, the UE may use the transmission schedule to identify a time period in which the channel parameter condition changes in response to the relay transmissions. The UE may modify a channel estimation measurement and reporting schedule based, at least in some aspects, on the time period in which the channel parameter condition changes. Accordingly, the UE may reset its channel estimation loop based on the instances in time in which the channel conditions may change due to relay transmissions.

A method of wireless communication at a relay node is described. The method may include establishing a control plane connection between the relay node and a base station, where establishing the control plane connection includes receiving from the base station a first network identifier for the relay node, receiving, via the control plane connection, a relay configuration from the base station, monitoring grants associated with a set of one or more UEs based on the relay configuration, each UE including a network identifier that is different from the first network identifier, and relaying communications between the base station and the set of one or more UEs according to the monitoring.

An apparatus for wireless communication at a relay node is described. The apparatus may include at least one processor, memory coupled with the at least one processor, and instructions stored in the memory. The instructions may be executable by the at least one processor to cause the apparatus to establish a control plane connection between the relay node and a base station, where establishing the control plane connection includes receiving from the base station a first network identifier for the relay node, receive, via the control plane connection, a relay configuration from the base station, monitor grants associated with a set of one or more UEs based on the relay configuration, each UE including a network identifier that is different from the first network identifier, and relay communications between the base station and the set of one or more UEs according to the monitoring.

Another apparatus for wireless communication at a relay node is described. The apparatus may include means for establishing a control plane connection between the relay node and a base station, where establishing the control plane connection includes receiving from the base station a first network identifier for the relay node, receiving, via the control plane connection, a relay configuration from the base station, monitoring grants associated with a set of one or more UEs based on the relay configuration, each UE including a network identifier that is different from the first network identifier, and relaying communications between the base station and the set of one or more UEs according to the monitoring.

A non-transitory computer-readable medium storing code for wireless communication at a relay node is described. The code may include instructions executable by a processor to establish a control plane connection between the relay node and a base station, where establishing the control plane connection includes receiving from the base station a first network identifier for the relay node, receive, via the control plane connection, a relay configuration from the base station, monitor grants associated with a set of one or more UEs based on the relay configuration, each UE including a network identifier that is different from the first network identifier, and relay communications between the base station and the set of one or more UEs according to the monitoring.

Some examples of the method, apparatuses, and non-transitory computer-readable medium described herein may further include operations, features, means, or instructions for identifying the set of one or more UEs based on each UE within the set of one or more UEs being located within a proximity range of the relay node, or a repetition rate for the relaying communications satisfying a threshold value, or a combination thereof.

In some examples of the method, apparatuses, and non-transitory computer-readable medium described herein, the relay configuration identifies the set of one or more UEs.

Some examples of the method, apparatuses, and non-transitory computer-readable medium described herein may further include operations, features, means, or instructions for receiving a signal via the control plane connection identifying the set of one or more UEs.

Some examples of the method, apparatuses, and non-transitory computer-readable medium described herein may further include operations, features, means, or instructions for receiving transmissions from each UE within the set of one or more UEs, where the set of one or more UEs may be identified based on the received transmissions.

Some examples of the method, apparatuses, and non-transitory computer-readable medium described herein may further include operations, features, means, or instructions for receiving a random access request from at least one UE in the set of one or more UEs, where monitoring the grants may be based on the random access request.

In some examples of the method, apparatuses, and non-transitory computer-readable medium described herein, receiving the random access request may include operations, features, means, or instructions for determining that a receive power level of the random access request satisfies a threshold, or that the relay transmissions associated with the random access request include a repetition rate satisfying a threshold value, or a combination thereof.

Some examples of the method, apparatuses, and non-transitory computer-readable medium described herein may further include operations, features, means, or instructions for relaying the random access request to the base station, receiving a random access response from the base station, and relaying the random access response to the at least one UE, where monitoring the grants may be based on the random access response.

Some examples of the method, apparatuses, and non-transitory computer-readable medium described herein may further include operations, features, means, or instructions for receiving a radio resource control configuration for the set of one or more UEs, where relaying communications between the base station and the set of one or more UEs may be based on the radio resource control configuration.

In some examples of the method, apparatuses, and non-transitory computer-readable medium described herein, the radio resource control configuration may be received via at least one of the control plane connection, or a medium access control (MAC) control element (CE), or a combination thereof.

Some examples of the method, apparatuses, and non-transitory computer-readable medium described herein may further include operations, features, means, or instructions for receiving an uplink transmission from each UE in the set of one or more UEs, determining, based on the uplink transmission, a channel performance metric associated with each UE, and transmitting a channel performance feedback report to the base station identifying the channel performance metric associated with each UE.

Some examples of the method, apparatuses, and non-transitory computer-readable medium described herein may further include operations, features, means, or instructions for transmitting a signal to the base station identifying a location of the relay node, where the set of one or more UEs may be based on the location of the relay node and a proximity range between each UE in the set of one or more UEs and the relay node satisfying a threshold.

Some examples of the method, apparatuses, and non-transitory computer-readable medium described herein may further include operations, features, means, or instructions for identifying a first priority metric for relaying communications between the base station and the set of one or more UEs and a second priority metric for performing communications between the base station and the relay node, where relaying communications between the base station and the set of one or more UEs may be based on the first priority metric being a higher priority metric than the second priority metric.

Some examples of the method, apparatuses, and non-transitory computer-readable medium described herein may further include operations, features, means, or instructions for monitoring, based on the relay configuration, a control signal identifying scheduling information for a corresponding data signal, and determining to relay communications between the base station and the set of one or more UEs based on a transmission configuration for the control signal or the data signal.

Some examples of the method, apparatuses, and non-transitory computer-readable medium described herein may further include operations, features, means, or instructions for decoding at least a portion of the control signal to identify the scheduling information for the corresponding data signal, decoding, based on the decoded portion of the control signal, at least a portion of the corresponding data signal, and determining to relay communications between the base station and the set of one or more UEs based on the transmission configuration for the control signal, or the corresponding data signal, or a combination thereof.

Some examples of the method, apparatuses, and non-transitory computer-readable medium described herein may further include operations, features, means, or instructions for identifying a transmission schedule associated with relaying communications between the base station and the set of one or more UEs, where the relaying may be performed according to the transmission schedule.

In some examples of the method, apparatuses, and non-transitory computer-readable medium described herein, the transmission schedule includes a set of starting points for relaying communications, and where relaying communications may be scheduled to start in at least one starting point of the set of starting points.

In some examples of the method, apparatuses, and non-transitory computer-readable medium described herein, relaying communications between the base station and the set of one or more UEs may include operations, features, means, or instructions for ramping up the transmission power of the communications relayed between the base station and the set of one or more UEs.

Some examples of the method, apparatuses, and non-transitory computer-readable medium described herein may further include operations, features, means, or instructions for determining that at least one of the communications may be received with a corresponding type of reference signal used for decoding the at least one communication, and determining whether to relay or refrain from relaying the at least one communication between the base station and the set of one or more UEs based on the corresponding type of reference signal.

Some examples of the method, apparatuses, and non-transitory computer-readable medium described herein may further include operations, features, means, or instructions for determining that the corresponding type of reference signal includes a demodulation reference signal (DMRS), and determining to relay the at least one communication between the base station and the set of one or more based on the DMRS.

Some examples of the method, apparatuses, and non-transitory computer-readable medium described herein may further include operations, features, means, or instructions for determining that the corresponding type of reference signal includes a cell-specific reference signal (CRS), and determining not to relay the at least one communication between the base station and the set of one or more based on the CRS.

Some examples of the method, apparatuses, and non-transitory computer-readable medium described herein may further include operations, features, means, or instructions for determining that at least one of the communications may be scheduled on overlapping resources used by the set of one or more UEs for performing channel performance measurement and reporting with the base station, and refraining, based on the overlapping resources, from relaying the at least one of the communications between the base station and the set of one or more UEs.

Some examples of the method, apparatuses, and non-transitory computer-readable medium described herein may further include operations, features, means, or instructions for delaying, based on a delay configuration, relaying communications between the base station and the set of one or more UEs, where the delay configuration may be based on a repetition factor for the communications between the base station and the set of one or more UEs.

Some examples of the method, apparatuses, and non-transitory computer-readable medium described herein may further include operations, features, means, or instructions for refraining, based on a corresponding reference signal, from relaying the at least one of the communications between the base station and the set of one or more UEs.

Some examples of the method, apparatuses, and non-transitory computer-readable medium described herein may further include operations, features, means, or instructions for transmitting a capability configuration to the base station identifying a count value of UE that the relay node may be capable of monitoring, where the set of one or more UEs may be based on the capability configuration.

A method of wireless communication at a UE is described. The method may include determining a transmission schedule associated with one or more relay nodes performing relay transmissions on a channel, identifying, based on the transmission schedule, a time period in which a channel parameter condition changes based on the relay transmissions, and modifying a channel estimation measurement and reporting schedule based on the time period in which the channel parameter condition changes.

An apparatus for wireless communication at a UE is described. The apparatus may include at least one processor, memory coupled with the at least one processor, and instructions stored in the memory. The instructions may be executable by the at least one processor to cause the apparatus to determine a transmission schedule associated with one or more relay nodes performing relay transmissions on a channel, identify, based on the transmission schedule, a time period in which a channel parameter condition changes based on the relay transmissions, and modify a channel estimation measurement and reporting schedule based on the time period in which the channel parameter condition changes.

Another apparatus for wireless communication at a UE is described. The apparatus may include means for determining a transmission schedule associated with one or more relay nodes performing relay transmissions on a channel, identifying, based on the transmission schedule, a time period in which a channel parameter condition changes based on the relay transmissions, and modifying a channel estimation measurement and reporting schedule based on the time period in which the channel parameter condition changes.

A non-transitory computer-readable medium storing code for wireless communication at a UE is described. The code may include instructions executable by a processor to determine a transmission schedule associated with one or more relay nodes performing relay transmissions on a channel, identify, based on the transmission schedule, a time period in which a channel parameter condition changes based on the relay transmissions, and modify a channel estimation measurement and reporting schedule based on the time period in which the channel parameter condition changes.

Some examples of the method, apparatuses, and non-transitory computer-readable medium described herein may further include operations, features, means, or instructions for detecting a ramp up of the relay transmissions on the channel, where the time period may be identified based on the detected ramp up of the relay transmissions.

Some examples of the method, apparatuses, and non-transitory computer-readable medium described herein may further include operations, features, means, or instructions for receiving, from a base station, a configuration signal identifying the transmission schedule.

DETAILED DESCRIPTION

Figure 1:
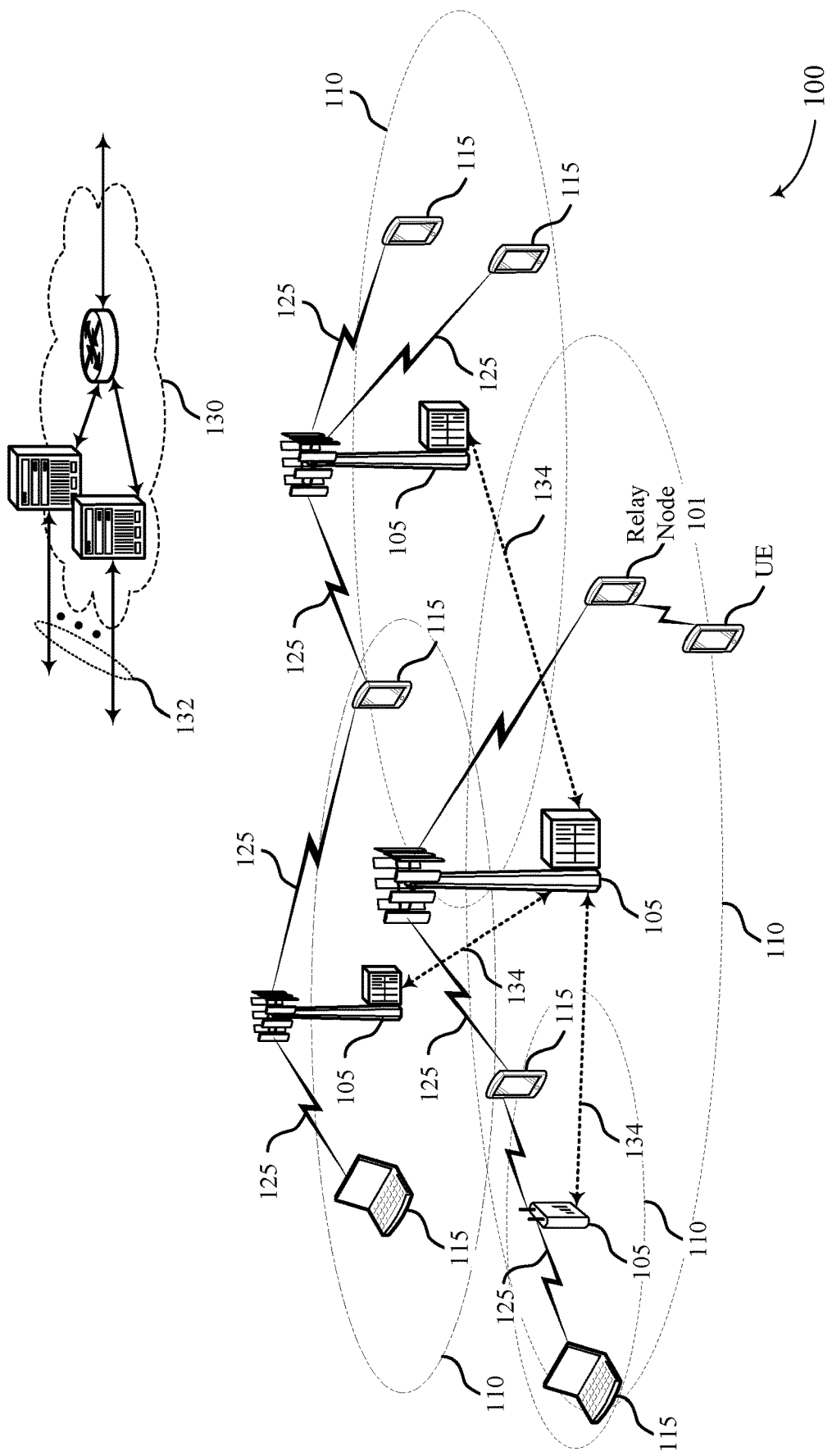
FIG. 1 illustrates an example of a system for wireless communications that supports in-band wireless relay operations in accordance with aspects of the present disclosure.

A wireless multiple-access communications system may include a number of base stations or network access nodes, each simultaneously supporting communication for multiple communication devices, which may be otherwise known as user equipment (UE). Some wireless networks may support relay operations using relay node(s). For example, the relay operations (e.g., uplink and/or downlink relay operations) may be implemented to support access and/or backhaul communications. In one example, the relay operations may be implemented due to the link between a relay node and a base station and/or the link between the relay node and the UE being better than the link between the UE and the base station. Relay operations may be additionally or alternatively implemented within a wireless network for various other reasons, e.g., to increase throughput. However, various aspects of relay operations introduce additional overhead (e.g., may use additional messages exchanged using over-the-air resources), may delay some communications, and/or may introduce additional considerations within the wireless network.

Aspects of the disclosure are initially described in the context of a wireless communications system, such as a wireless network supporting relay operations. Aspects of the disclosure provide for a relay node to obtain a cell radio network temporary identifier (C-RNTI) during control plane establishment with a base station. The relay node may be a UE and/or a base station that is configured to support relay operations within the wireless network. The relay node may, for example, upon initial power up, establish the control plane connection with the base station and, during the control plane connection establishment, receive the C-RNTI (e.g., a first network identifier) from the base station. The relay node may also receive a relay configuration from the base station. The relay configuration may indicate that the relay node is to perform relay operations for a set of UE(s). In some examples, the relay configuration may use a bit, flag, information element (IE), etc., that informs the relay node of the relay operations. In some examples, the relay configuration may identify the set of UE(s) that the relay node is to perform relay operations for. In some examples, the relay configuration may indicate the resources (e.g., control and/or data channel time, frequency, spatial, code, etc., resources) that the relay node may monitor and/or use for performing the relay operations, e.g., various physical layer parameters for the UE(s) in the set of UE(s). The relay node may use the information indicated in the relay configuration to monitor for grant(s) for the set of UE(s) (e.g., a set of one or more UEs). In some aspect, each UE that the relay node is performing relay operations for may have its own network identifier (e.g., a second network identifier) that is used by the relay node to determine whether the grant is a communication to be relayed. If so, the relay node may relay the communications between the base station and the UE(s), e.g., uplink and/or downlink communications based on the monitoring.

In some aspects, a UE operating in a wireless network supporting relay operations may modify its channel measurement and reporting protocols based on the relay operations. Generally, relay operations introduce additional uplink and/or downlink transmissions over the wireless network. As the relay operations may be sporadic in nature, the sudden addition and/or removal of the extra relay transmissions over the network may suddenly change the channel parameter conditions of the wireless network. Accordingly, UE(s) operating within a network supporting relay operations may identify or otherwise determine the transmission schedule for the relay transmissions on the channel. Based on the transmission schedule, the UE(s) may identify the time period in which the channel parameter condition changes (e.g., due to the start or end of relay transmissions within the wireless network). In response, the UE(s) may modify the channel estimation measurement and reporting schedule based on the time period in which the channel parameter condition changes. Thus, the UE(s) may adapt channel measurement and reporting to improve such operations within a network supporting relay operations.

Aspects of the disclosure are further illustrated by and described with reference to apparatus diagrams, system diagrams, and flowcharts that relate to in-band wireless relay operations.

FIG. 1 illustrates an example of a wireless communications system 100 that supports in-band wireless relay operations in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, one or more UEs 115 or other devices may be configured or otherwise serve as a relay node 101 (with one relay node 101 being shown by way of example only). Generally, the relay node 101 may establish a control plane connection between the relay node 101 and a base station 105, wherein establishing the control plane connection comprises receiving from the base station 105 a first network identifier for the relay node 101. The relay node 101 may receive, via the control plane connection, a relay configuration from the base station 105. The relay node 101 may monitor grants associated with a set of one or more UEs 115 based at least in part on the relay configuration, each UE 115 comprising a network identifier that is different from the first network identifier. The relay node 101 may relay communications between the base station 105 and the set of one or more UEs 115 according to the monitoring.

In some aspects, a UE 115 may determine a transmission schedule associated with one or more relay nodes 101 performing relay transmissions on a channel. The UE 115 may identify, based at least in part on the transmission schedule, a time period in which a channel parameter condition changes based at least in part on the relay transmissions. The UE 115 may modify a channel estimation measurement and reporting schedule based at least in part on the time period in which the channel parameter condition changes.

Figure 2A:
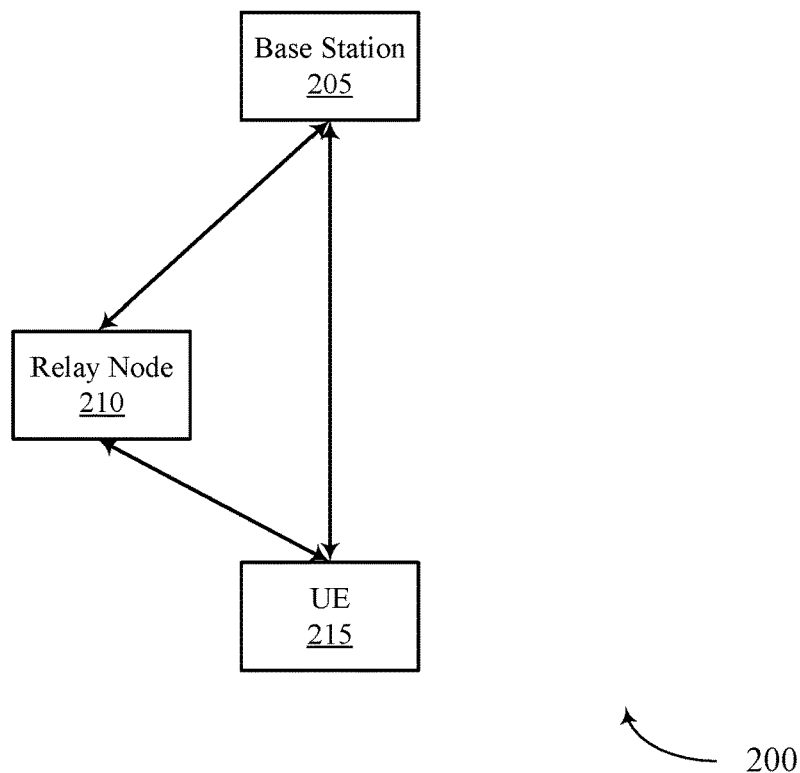
FIG. 2A-2B illustrates examples of a wireless communication system that supports in-band wireless relay operations in accordance with aspects of the present disclosure.
Figure 2B:
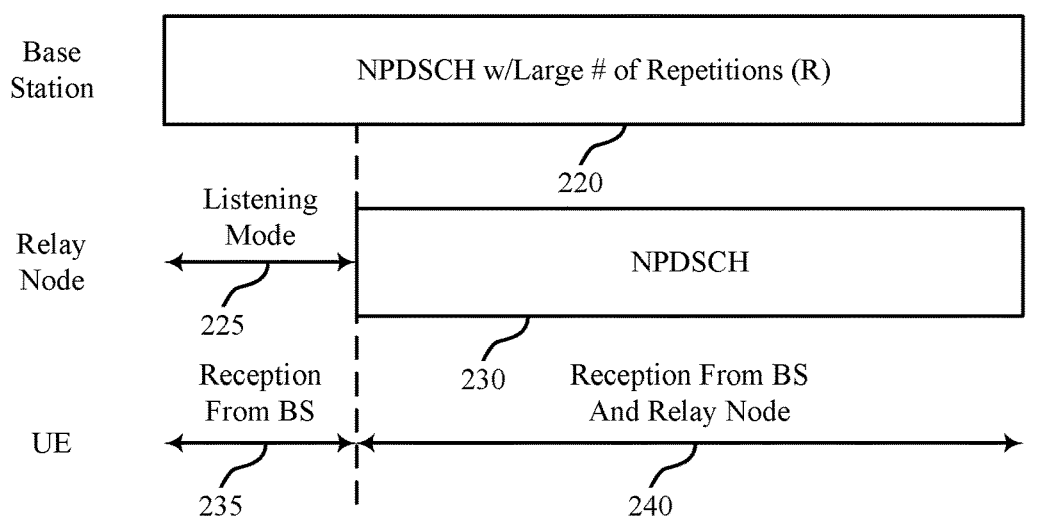

FIGS. 2A and 2B illustrate examples of a wireless communications system 200 that supports in-band wireless relay operations in accordance with aspects of the present disclosure. In some examples, wireless communications system 200 may implement aspects of wireless communications system 100. Aspects of wireless communications system 200 may be implemented by base station 205, relay node 210, and/or UE 215, which may be examples of the corresponding devices described herein. Generally, FIG. 2A illustrates a wireless communications system 200 that is configured for, or otherwise supports, relay operations and FIG. 2B illustrates an example relay timeline 201 used for relay communications within wireless communications system 200.

Generally, wireless communications system 200 may support relay operations where relay node 210 relays communications between base station 205 and UE 215. Although only one base station 205, relay node 210, and UE 215 are shown in wireless communications system 200, it is to be understood that additional devices may be included in wireless communications system 200. Moreover, the relay operations may include more than one hop (e.g., there may be additional relay nodes relaying communications between base station 205 and UE 215). Within this context, communications between base station 205 and relay node 210 may be considered one hop, communications between relay node 210 and UE 215 may be considered one hop, and communications between relay node 210 and another relay node (not shown) may be considered another hop.

In some aspects, wireless communications system 200 may support varying types of communications. For example, wireless communications system 200 may support eMTC communications, narrowband (NB) IoT (NB-IoT) communications, and the like. In some aspects, wireless communications system 200 may support access and/or backhaul relay operations. In some aspects, relay operations within wireless communications system 200 may provide coverage extension for such communications, e.g., coverage extension for eMTC/NB-IoT communications.

In some aspects, wireless communications system 200 may support in-band layer 1 relay operations that intercepts uplink and/or downlink transmissions and performs single frequency network (SFN) relay transmissions in the uplink and/or downlink. Aspects of the described techniques may include exploiting the early termination at the relay node 210 in addition to a large number of repetitions. In some aspects, the base station 205—relay node 210—UE 215 connection may be better than the base station 205—UE 215 connection.

In some aspects, wireless communications system 200 may use a relay configuration to support various aspects of the relay operations. Examples of the features wireless communications system 200 addresses include, but are not limited to, how to establish a control plane connection between relay node 210 and base station 205, how relay node 210 knows which UE(s) it supports for relay operations, half-duplex/general operation (e.g., prioritization), etc. Aspects of the described techniques may address channel measurement and reporting, quasi-colocation (QCL) issues, what the UE 215 knows regarding relay operations, etc.

In some aspects, relay node 210 may establish a control plane connection between relay node 210 and base station 205. In some aspects, this may include receiving or otherwise obtaining a first network identifier (e.g., a C-RNTI) for relay node 210. Relay node 210 may receive, via the control plane connection, a relay configuration from base station 205. Relay node 210 may monitor grants associated with a set of UE(s) based, at least in some aspects, on the relay configuration. In some aspects, each UE within the set of UE(s) may have a unique identifier (e.g., a second network identifier), such as its own C-RNTI. Accordingly, UE 215 may also have a second network identifier that is different from the first network identifier of relay node 210.

For example, upon power up relay node 210 may perform a random access procedure with base station 205 (e.g., mimicking a UE) and obtain a physical layer parameters (e.g., a timing advance, power control, etc.). Relay node 210 may also receive or otherwise establish a control plane connection with base station 205 for a control plane exchange between relay node 210 and base station 205. Relay node 210 may receive the C-RNTI (e.g., the first network identifier) and monitor grants based on the C-RNTI to, for example, update configuration parameters as needed. In some aspects, relay node 210 may set its downlink timing to be equal to the measured downlink timing for base station 205 as measured at relay node 210.

Relay node 210 may monitor for grants using the C-RNTI of different UE (e.g., for relaying communications between the base station 205 and the set of UE(s), such as UE 215). Relay node 210 may also monitor for grants using its own C-RNTI for its own control plane communications with base station 205. In some aspects, the C-RNTI that relay node 210 uses for its own control communications may be configured or otherwise established by base station 205 after initial access.

In some aspects, physical layer procedures may be modified, at least to some degree, e.g., assuming that the relay node 210 is configured as a "high category" or "high priority" UE from the perspective of base station 205. For example, processing delays at relay node 210 may be smaller than those of UE 215 within the set of UE(s), e.g., no scheduling delay, N+4 for decoding (where N refers to the number of slots between a grant and the corresponding data signal). In some aspects, if there is a conflict or collision between the control channel communications of relay node 210 and relaying communications, relay node 210 may give higher priority to its own control channel communications. Accordingly, relay node 210 may identify a first priority metric for relaying communications between base station 205 and the set of UE(s) and a second priority metric for performing communications between base station 205 and relay node 210. Relay node 210 may relay communications between base station 205 and the set of UE(s) based, at least in some aspects, on the first priority metric being a higher priority metric than the second priority metric.

A given base station (such as base station 205) may potentially serve hundreds of UEs at the same time (e.g., there could potentially be hundreds of UEs in the set of UE(s)). In theory, this would mean that relay node 210 may need to monitor the control channel for all of these UEs, which may not be feasible. Accordingly, in some aspects relay node 210 may transmit or otherwise provide a capability configuration that carries or otherwise conveys an indication of a maximum number of UEs that relay node 210 can monitor (e.g., in terms of the maximum number of supported C-RNTIs that relay node 210 can monitor). Accordingly, relay node 210 may transmit or otherwise provide a capability configuration to base station 205 identifying a count value of UEs that relay node 210 is capable of monitoring. The set of UE(s) that relay node 210 monitors grants for may be based, at least in some aspects, on the capability configuration of relay node 210.

In some aspects, the described techniques may support relay node 210 serving a subset of the UEs that base station 205 may serve (e.g., the set of UE(s) in which relay node 210 performs relay operations may be a subset of the potentially hundreds of UEs that base station 205 may serve). Accordingly, relay node 210 may identify or otherwise determine the set of UE(s) in which it monitors grants for according to the relay configuration. In some aspects, relay node 210 may determine or otherwise identify the set of UE(s) based, at least in some aspects, on each UE within the set of UE(s) being located within a defined proximity range of relay node 210 and/or on a repetition rate for relaying communications satisfying a threshold. That is, the UE within the set of UE(s) served by relay node 210 may include UE that are close to relay node 210 and/or use a large number of repetitions of the communications being relayed. In some aspects, the UE within the set of UE(s) may be identified based on the relay configuration, a signal received via a control plane connection, and/or based on receiving uplink transmissions from each UE within the set of UE(s).

As discussed, relay node 210 may generally identify the UE within the set of UE(s) that it serves for performing relay operations. In some aspects, identifying the UE within the set of UE(s) may be initiated by relay node 210 and/or initiated by base station 205.

For the relay node 210 initiated approach, relay node 210 may identify the UE within the set of UE(s) via the control plane connection established between relay node 210 and base station 205. As one example, relay node 210 may be configured to monitor a subset of the random access resources (e.g., relay node 210 receiving an uplink transmission from a UE, such as UE 215). For example, relay node 210 may monitor random access resources with a large number of repetitions. In some aspects, relay node 210 may be configured with a receive uplink power threshold. If relay node 210 detects a random access preamble (or other uplink transmission) with a receive power level exceeding the threshold, relay node 210 may consider the UE that transmitted the preamble (or other uplink transmission) as a candidate for relaying communications between UE 215 and base station 205.

For example, if relay node 210 detects any preamble (e.g., a random access request) meeting these requirements (e.g., with an uplink receive power level exceeding the threshold), relay node 210 may begin monitoring (e.g., a control channel, such as a NPDCCH) for grants (e.g., a random access response) from base station 205 (e.g., relay node 210 receiving downlink transmissions from base station 205). For random access response relaying (e.g., NPDCCH and/or narrowband PDSCH (NPDSCH) random access response) and if early termination at relay node 210 is possible, several options may be implemented. In a first option and during this phase, relay node 210 may receive the random access response and identify the network identifier (e.g., RNTI) of candidate UE for relaying and/or potential location for the corresponding message 3, but may not relay the random access response to the UE (e.g., relay node 210 may assume that the UE receives a random access response directly from base station 205). In a second option, if relay node 210 decodes the random access response early, it may transition to a transmission mode where it transmits (e.g., relays) the random access response to the UE. In a third option, base station 205 may signal whether the PDSCH/message 3 should be relayed (e.g., in the random access response itself, implicitly based on the number of repetitions, etc.).

After random access response reception, relay node 210 may identify the set of UE(s) for potential relaying, and also knows the location (e.g., time, frequency, spatial, code, etc., resource) of the message 3 for the UE within the set of UE(s) (e.g., from the random access response grant). Relay node 210 may begin receiving uplink transmissions from the UE(s) in the set of UE(s) and begin performing relay communications for one or more of these UE(s).

In some aspects, after security activation, relay node 210 may need to know at least some of the RRC configuration of the UE within the set of UE(s) that relay node 210 performs relay communications for (e.g., the relay configuration information). In some aspects, this may include a number of repetitions for NPDCCH, a search space configuration, a transport block size (TBS) configuration, etc. In some aspects, base station 205 may transmit this information in a cyphered or otherwise secured message to relay node 210. In some aspects, this information (e.g., the relay configuration) may be sent from base station 205 to relay node 210 via the control plane connection, e.g., before or after the RRC configuration information is sent to the corresponding UE. In some aspects, this information (e.g., the relay configuration) may be sent from base station 205 to relay node 210 in a MAC control element (CE) embedded within a MAC protocol data unit (PDU). In some aspects, relay node 210 uses the information indicated in the MAC CE to determine the relay configuration, e.g., relay node 210 may need to determine the physical layer parameters for the UE within the set of UE(s) that it performs relay communications for.

For the base station 205 initiated approach, base station 205 may transmit a signal, message, etc., to relay node 210 via the control plane connection that identifies or otherwise indicates a set of network identifiers (e.g., C-RNTIs corresponding to the UE within the set of UE(s)) for which relay node 210 is to perform relaying. Relay node 210 may start monitoring the set of C-RNTIs and relaying the corresponding information (e.g., monitoring for grants associated with the C-RNTIs and relaying communications based on any received grants).

In some aspects, base station 205 may configure relay node 210 to measure an uplink physical channel/signal (e.g., a sounding reference signal (SRS)) from UE. In some aspects, relay node 210 may report the information (e.g., a channel performance metric associated with each UE) to base station 205 via a channel performance feedback report. For example, base station 205 may modify or otherwise change the relay configuration of relay node 210 based on the reported channel performance metric. In some aspects, base station 205 may configure relay node 210 to relay communications if the SRS reception is above a given threshold. For example, if the channel performance metric measured using an SRS satisfies the threshold, this may serve to identify the corresponding UE as a UE within the set of UE(s) that relay node 210 performs relay communications for. In some aspects, this may include base station 205 transmitting or otherwise providing SRS information to relay node 210 about the corresponding UE.

In some aspects, base station 205 may configure relay node 210 to perform relay operations for UE within the set of UE(s) based on the relative position of the relay node 210 and the UE (e.g., such as UE 215). For example, relay node 210 may transmit or otherwise provide a signal to base station 205 identifying the location of relay node 210. The UE within the set of UE(s) may be based, at least in some aspects, on the location of the relay node 210 and the proximity range between each UE in the set of UE(s) and relay node 210 satisfying a threshold.

In some aspects, relay node 210 may be configured with some degree of prioritization between different channels, e.g., PDCCH/PDSCH to relay, PDSCH to decode, PDCCH to monitor, etc.

With respect to a downlink transmissions, channel coherence time may impact the start of relaying. In some aspects, wireless communications system 200 may use cross-subframe channel estimation (e.g., averaging some reference signal, such as DMRS, across multiple subframes) e.g., for NB-IoT/eMTC types of communications. If the channel changes suddenly due to relay node 210 starting transmission, the performance of some UEs may be impaired. Accordingly, aspects of the described techniques may include one or more UE (such as UE 215) within a set of UE(s) modifying or otherwise changing certain parameters in response to the relay communications occurring.

For example, UE 215 may identify or otherwise determine the transmission schedule associated with relay node (s) (such as relay node 210) performing relay transmissions on the channel. UE 215 may also determine or otherwise identify the time period in which a channel parameter condition may change based on the relay transmissions according to the transmission schedule. Accordingly, UE 215 may modify or otherwise change a channel estimation measurement and reporting schedule based on the time period in which the channel parameter condition changes.

Similarly, relay node 210 may identify the transmission schedule associated with relaying communications between base station 205 and the set of UE(a) (e.g., UE 215). Relay node 210 may relay communications according to the transmission schedule. In some aspects, the transmission schedule may include a set of starting points for relaying communications, with relaying communications scheduled to start in at least one starting point of the set of starting points. In some examples, each starting point may be based on the decoding time of base station 205, relay node 210, and/or UE 215. In some examples, each starting point may be based on, or otherwise correspond to, a transmission opportunity for each instance of a communication according to a repetition factor.

That is, aspects of the described techniques may define some instances in time in which the channel conditions may change (and, therefore, UE 215 may need to reset its channel estimation loop). These time instances may depend on the repetition number for PDSCH/PDCCH or other parameters. In some aspects, this may include relay node 210 implementing a slow ramp up filter to smooth the transition. In some aspects, these approaches may depend on whether UE 215 is aware of the existence of relay nodes operating within wireless communications system 200. Moreover, aspects of these approaches may be applied to the second order filters (e.g., Doppler/power delay profile (PDP) filters). For UE within the set of UE(s) that are aware of relay nodes, aspects of the described techniques may include determining a subset of subframes to be used by relay nodes in order to estimate channel parameters and conditions.

In some aspects, the channel parameters may be determined based on performing measurements by UE 215. In some aspects, transmitting a reference signal may affect the reference signal received power (RSRP)/reference signal received quality (RSRQ) estimation of all UE within a cell and/or may affect power control. To address this, aspects of the described techniques may include enabling relaying based on a certain type of reference signal. For example, relay node 210 may determine to relay communications between base station 205 and UE 215 based on determining that a communication is received with a DMRS, but refrain from relaying communications based on the determining that a communication is received with a cell specific reference signal (CRS). Additionally or alternatively, relay node 210 may determine to relay communications between base station 205 and UE 215 based on determining that the reference signal is not used for measurements (e.g., radio resource management (RRM) measurements and the like), and refrain from relaying communications based on determining that the reference signal is used or measurements (e.g., for CRS-based transmission in the center six PRBs for eMTC, or for NRS-based transmission in NB-IoT in an anchor carrier). In this case, additionally, UE 215 may update its power control parameters not based on the estimated pathloss (e.g., base station 205 may configure alpha=0 to turn off open loop power control).

Accordingly, aspects of the described techniques may include relay node 210 ramping up the transmission power of the communications relayed between base station 205 and the set of UE(s).

With respect to uplink transmissions, aspects of the described techniques may include delayed relaying. That is, in some cases it may be beneficial for relay node 210 to delay the relay operation, e.g., in order to increase the amount of relayed data. In some scenarios, this may include the UE transmitting with 64 repetitions each and the starting of set of 20 ms. Relay node 210 may need 30 ms to decode the transmissions and base station 205 may need 10 ms to decode the transmissions from relay node 210. Performing relay operations immediately in this scenario may mean that relay node 210 is blocked for at least 20 ms. In another approach, delayed relaying may mean that relay node 210 is only blocked for 10 ms and, instead, may begin relying a first uplink transmission after decoding a second uplink transmission.

Accordingly, aspects of the described techniques for delayed relaying operations may include relay node 210 not starting transmission in the uplink until it is necessary, e.g., if the total number of repetitions for a channel is R, base station 205 needs R0 to decode transmissions from relay node 210, then begin or otherwise start transmitting a repetition at R-R0.

In some aspects, this may include, while relaying uplink transmissions (e.g., PUSCH), relay node 210 may monitor for a downlink control channel signal (e.g., PDCCH) indicating that the transmission has been successful. When received, relay node 210 may stop the transmission (e.g., may stop relaying communications in response to the transmission being successful). Accordingly, this may serve as an indication of an early termination of relay operations to relay node 210.

With respect to relaying narrowband physical random access channel (NPRACH) transmissions, it may be difficult for relay node 210 to determine how close a given UE is since the UE is in an idle mode. Accordingly, aspects of the described techniques may include, during a previous connection, the UE being identified as "relayable" by base station 205 and/or relay node 210. From then on, the UE may be configured to transmit at a reduced number of repetitions for NPRACH (e.g., for the next cell access procedure). In another approach, aspects of the described techniques may include a system information block (SIB) indicating that there are relays deployed within wireless communications system 200. The UE within the set of UE(s) (such as UE 215) may try a different number of repetitions first to determine whether or not there is a relay node 210, e.g., UE 215 may first try N repetitions and, if that doesn't work, fall back to normal operations. In some aspects, this may include UE 215 being aware of relay node 210. One way this is implemented (in a way that is transparent to UE 215) is to match the number of repetitions for different coverage levels assuming the presence of relay node 210. In this context, the fallback may follow naturally by cyclic extension (CE) level wrapping. In the situation where UE 215 is aware of relay node 210, base station 205 may signal separate time/frequency resources for the reduced number of repetitions.

In some aspects, wireless communications system 200 may not be a SFN based network (e.g., non-SFN relay). For uplink transmissions, relay node 210 may receive transmissions from UE 215 in a given frequency, e.g., carrier, narrowband, PRB, subcarrier, etc.), And then relay that transmission in a different frequency. If the frequency separation is large enough, then UE 215 may be able to operate in a full-duplex mode. In some aspects, this may be transparent to UE 215 (e.g., relay node 210 may build the physical packet and transmit in a different frequency). However, this approach may mean that base station 205 cannot soft combine the output from UE 215 and relay node 210. In some aspects, the scrambling sequence for the relay node 210 uplink transmission may be the same or different than the scrambling sequence used by UE 215.

Another approach is for UE 215 and relay node 210 to use a distributed space-time code (or space-frequency). The transmissions may overlap in time and/or frequency. UE 215 and relay node 210 may be configured with orthogonal reference signal (e.g., DMRS) resources. The precoding may be different from UE 215 and relay node 210. Since UE 215 is transparent, it may transmit the unprecoded data (e.g., [X1 X2]) and relay node 210 can apply an Alamouti transformation and perform [−X2* X1] for the relayed communications. Accordingly, in some aspects relay node 210 may determine that at least one of the communications is scheduled on the overlapping resources used by the set of UE(s) for performing channel performance measurement and reporting with base station 205. In some aspects, relay node 210 may refrain from relaying the communications based, at least in some aspects, on the overlapping resources.

Accordingly and for an example of downlink communications being relayed from base station 205 to UE 215, base station 205 may begin a downlink transmission 220 (e.g., a NPDSCH transmission) to UE 215, where the downlink transmission 220 has a large number of repetitions (R). Initially, relay node 210 may be operating in a listening mode 225 where it monitors grants associated with the set of UE(s) according to the relay configuration. Based on detecting one or more grants, relay node 210 may relay communications 230 from base station 205 to UE 215. During the listening mode 225, UE 215 may receive the downlink transmissions 220 directly from base station 205 during reception period 235 and, during reception period 240, receive both downlink transmissions 220 and relay communications 230 from base station 205 and relay node 210, respectively.

Figure 3:
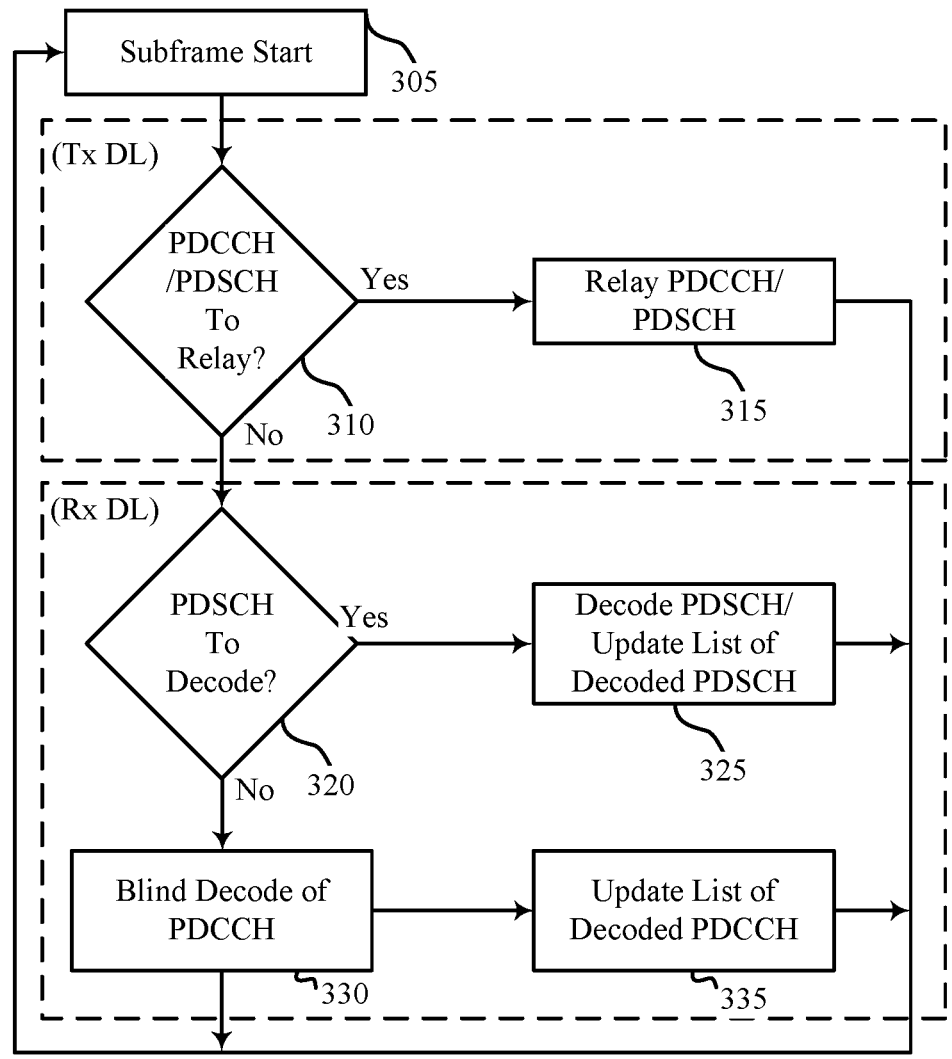
FIG. 3 illustrates an example of a method that supports in-band wireless relay operations in accordance with aspects of the present disclosure.

FIG. 3 illustrates an example of a method 300 that supports in-band wireless relay operations in accordance with aspects of the present disclosure. In some examples, method 300 may implement aspects of wireless communications systems 100 and/or 200. Aspects of method 300 may be implemented by relay node, which may be an example of corresponding devices described herein.

Generally, the relay node may relay communications between a base station and a set of UE(s) according to monitoring grants associated with the set of UE(s). In some examples, the relay node may operate according to certain constraints. One example may include the relay node supporting FDD, but not being full-duplex, e.g., the relay node cannot transmit and receive at the same time in the downlink direction, but can receive/transmit in the uplink/downlink direction while it can transmit/receive in the downlink/uplink direction. That is, within a given slot the relay node may receive both uplink and downlink, transmit both uplink and downlink (or potentially just one), receive an uplink/transmit downlink, receive downlink/transmit uplink.

In some aspects, the relay node may be configured with some degree of prioritization between different channels. Generally, method 300 illustrates an approach implemented by the relay node with prioritization between different channels. In some aspects of method 300, the relay node may monitor NPDCCH to find the grants for UE within the set of UE(s), and then start relaying operations. In a broad sense, the prioritization may be that, if there is something to relay, then relay it. Otherwise, the relay node may monitor for its own downlink transmissions from the base station.

At 305, a subframe may begin. As discussed, some examples of the described techniques may be implemented in a SFN network or a non-SFN network.

At 310, the relay node may determine whether or not there are any communications (e.g., PDCCH and/or PDSCH) to relay. From the list of PDCCH/PDSCH to relay, the relay node may determine whether or not to relay the communications depending on the set of conditions. Examples of the conditions include, but are not limited to, the number of repetitions for PDCCH/PDSCH (both the total number of repetitions and a remaining number of repetitions), the TBS for the communications, a modulation and coding scheme (MCS) for the communications, and/or the network identifier associated with the communications (e.g., C-RNTI/others, where the decision to relay may be different for different UEs). If there are communications to relay and the conditions are met, at 315 the relay node may relay the communications between the base station and UE (e.g., a relay PDCCH and/or PDSCH communications).

If there are no communications to relay, at 320 the relay node may receive downlink transmissions (e.g., determine whether there is a PDSCH to decode). For example, the relay node may have already detected the PDCCH and, therefore, knows the resource allocation/TBS/etc., for the corresponding data transmission. If the network identifier (e.g., C-RNTI) or other conditions (e.g., the number of PDSCH repetitions indicated in the DCI) are not met, the relay node may skip decoding PDSCH. Otherwise, at 325 the relay node may decode PDSCH and/or update the list of decoded PDSCH.

At 330, the relay node may perform blind decoding of PDCCH, if available. That is, for PDCCH monitoring the relay node may blindly try to detect the PDCCH for different UE (e.g., as configured by the list of C-RNTI, such as in the relay configuration). Upon detection, the relay node may decode the PDCCH and, at 335, update the list of decoded PDCCH. That is, the relay node may add the decoded PDCCH to a list of decoded uplink/downlink grant.

Generally, method 300 is illustrated with respect to downlink transmissions being relayed from the base station to a UE. However, it is to be understood that method 300 may also be applicable to uplink transmissions being relayed from a UE to the base station.

For uplink transmissions, the grant information can be accessed by the relay node similarly as for downlink transmissions (e.g., by decoding PDCCH). In the event where semi-persistent scheduling (SPS) is used, the base station may indicate this information to the relay node by, e.g., the control plane connection. The operations for uplink relaying may be a bit more complicated because, for downlink transmissions in a given carrier, a single UE can be served at a time period. For uplink, aspects of the described techniques may have multiple UEs (staggered in time) served at the same time, assuming that the relay node can transmit multiple PUSCH at same time. In general and in a given uplink slot, the relay node may perform monitoring for a random access (uplink receive operations), receiving uplink data signals (e.g., PUSCH, uplink receive operations), and/or relay uplink data signals (e.g., PUSCH, uplink transmission operations).

In some aspects, prioritizations may be performed between these channels, e.g., depending upon the number of repetitions, the C-RNTI, etc., and/or as configured by the base station. In some examples the relay node may not be able to transmit the complete set of repetitions, but only a subset (e.g., if the relay node knows that the base station needs R0<R to decode from the relay node, the relay node may relay only a small part of the repetitions and, instead, move to a receiving mode for the rest of the slot).

That is, the relay node may determine to relay only a subset of the physical channels. For example, in some cases the UE may be uplink limited (e.g., UEs with reduced transmit power), and the relay node may only relay uplink channels. The determination of what channels to relay may be based on the configuration information received from the base station. For example, the base station may configure the relay node to relay information for PUSCH for data (e.g., avoid PUCCH, PRACH, and/or downlink channels). In some aspects, the configuration information may be on a per-hop and UE/C-RNTI basis, e.g., the relay node may relay PUSCH/PDSCH for some UEs, PDCCH/PUSCH/PDSCH for other UEs, etc.

In some aspects, the relay node may also be configured to relay PRACH. For example, the relay node may be configured to relay PRACH if the received signal is above a threshold and/or if the measured timing advance is below a threshold. In some examples, the relay node may be configured to relay only a subset of the PRACH resources (e.g., the PRACH resources used for deep coverage).

Figure 4:
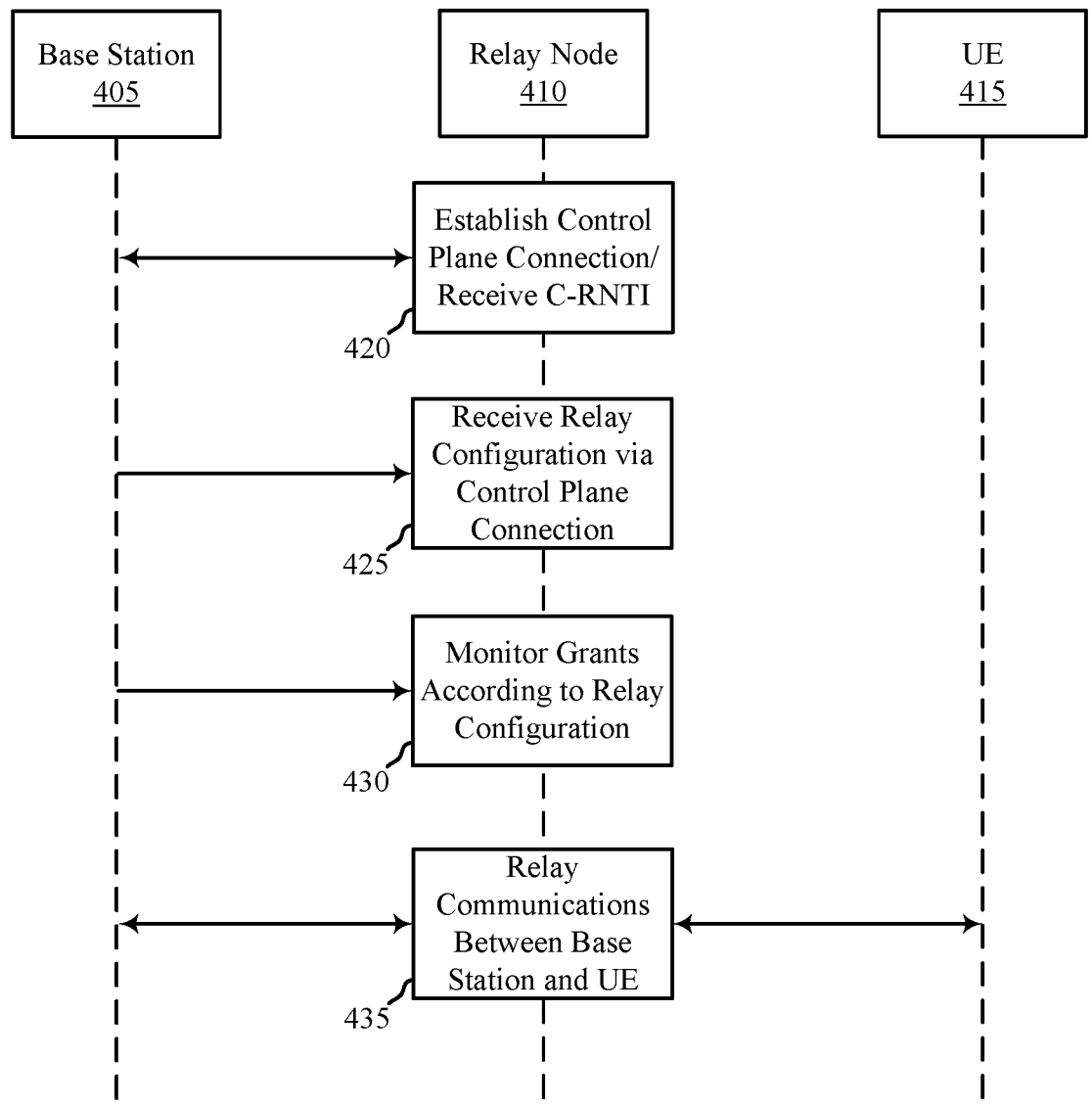
FIG. 4 illustrates an example of a process that supports in-band wireless relay operations in accordance with aspects of the present disclosure.

FIG. 4 illustrates an example of a process 400 that supports in-band wireless relay operations in accordance with aspects of the present disclosure. In some examples, process 400 may implement aspects of wireless communication systems 100 and/or 200, and/or method 300. Aspects of process 400 may be implemented by a base station 405, relay node 410, and/or UE 415, which may be examples of the corresponding devices described herein.

At 420, relay node 410 may establish a control plane connection between relay node 410 and base station 405. In some aspects, this may include receiving a first network identifier for the relay node 410 from base station 405. In some aspects, this may include relay node 410 receiving a RRC configuration for the set of UE(s), and relaying communications between base station 405 and the set of UE(s) based on the RRC configuration. In some aspects, the RRC configuration may be received via the control plane and/or via a MAC CE. In some aspects, this may include relay node 410 transmitting a signal to base station 405 identifying the location of relay node 410. The set of UE(s) may be based on the location of the relay node 410 and a proximity range between each UE in the set of UE(s) and relay node 410 satisfying a threshold.

At 425, relay node 410 may receive a relay configuration from base station 405 via the control plane connection. In some aspects, this may include relay node 410 identifying the set of UE(s) based at least in part on each UE within the set of UE(s) being located within a proximity range of relay node 410 and/or based on a repetition rate for the relaying communications satisfying a threshold value. In some examples, the relay configuration may identify the UE in the set of UE(s). In some aspects, this may include the relay node 410 receiving a signal from base station 405 via the control plane connection that identifies the UE in the set of UE(s). In some aspects, this may include the relay node 410 receiving transmissions (e.g., uplink transmissions) from each UE within the set of UE(s) and identifying the set of UE(s) based at least in part on the received transmissions.

At 430, relay node 410 may monitor grants associated with the set of UE(s) based, at least in some aspects, on the relay configuration. In some aspects, each UE may have a corresponding network identifier that is different from the first network identifier of relay node 410.

In some aspects, this may include relay node 410 receiving a random access request from UE 415, and monitoring the grants based at least in part on the random access request. In some aspects, this may include relay node 410 determining that the receive power level of the random access request satisfies a threshold and/or that relaying transmissions associated with the random access request includes a repetition rate satisfying a threshold value. In some aspects, this may include relay node 410 relaying the random access request to base station 405 and receiving a random access response from base station 405. Relay node 410 may relay the random access response to UE 415, and monitor the grants based at least in part on the random access response.

At 435, relay node 410 may relay communications between base station 405 and UE 415. In some aspects, this may include relay node 410 identifying a first priority metric for relaying communications between base station 405 and the set of UE(s) and a second priority metric for performing communications between base station 405 and relay node 410. In some aspects, relaying communications between base station 405 and the set of UE(s) may be based on the first priority metric being a higher priority metric than the second priority metric.

In some aspects, this may include relay node 410 monitoring a control signal identifying scheduling information for a corresponding data signal. Relay node 410 may determine to relay communications between base station 405 and the set of UE(s) based on the transmission configuration for the control signal and/or the data signal. In some aspects, this may include relay node 410 decoding at least a portion of the control signal to identify the scheduling information for the corresponding data signal. Relay node 410 may decode, based on the decoded portion of control signal, at least a portion of the corresponding data signal. Relay node 410 may determine to relay communications between base station 405 and the set of UE(s) based on the transmission configuration for the control signal and/or the corresponding data signal.

In some aspects, this may include relay node 410 identifying a transmission schedule associated with relaying communications between base station 405 and the set of UE(s). Relaying communications between base station 405 and the set of UE(s) may be performed according to the transmission schedule. In some aspects, the transmission schedule may include a set of starting points for relaying communications, with relaying communications being scheduled to start in at least one starting point of the set of starting points.

In some aspects, this may include relay node 410 ramping up the transmission power of the communications relayed between base station 405 and the set of UE(s).

In some aspects, this may include relay node 410 determining that at least one of the communications is received with a corresponding type of reference signal used for decoding the at least one communication, e.g., DMRS or CRS reference signal types, measurement or non-measurement-based reference signals, etc. Relay node 410 may determine whether to relay or refrain from relaying the at least one communication between base station 405 and the set of UE(s) based on the corresponding type of reference signal. For example, relay node 410 may determine that the corresponding type of reference signal is a DMRS and determine to relay the communication between base station 405 and the set of UE(s) based on the DMRS. In another example, relay node 410 may determine that the corresponding type of reference signal is a CRS and determine not to relay the communication between base station 405 and the set of UE(s) based on the CRS.

Figure 5:
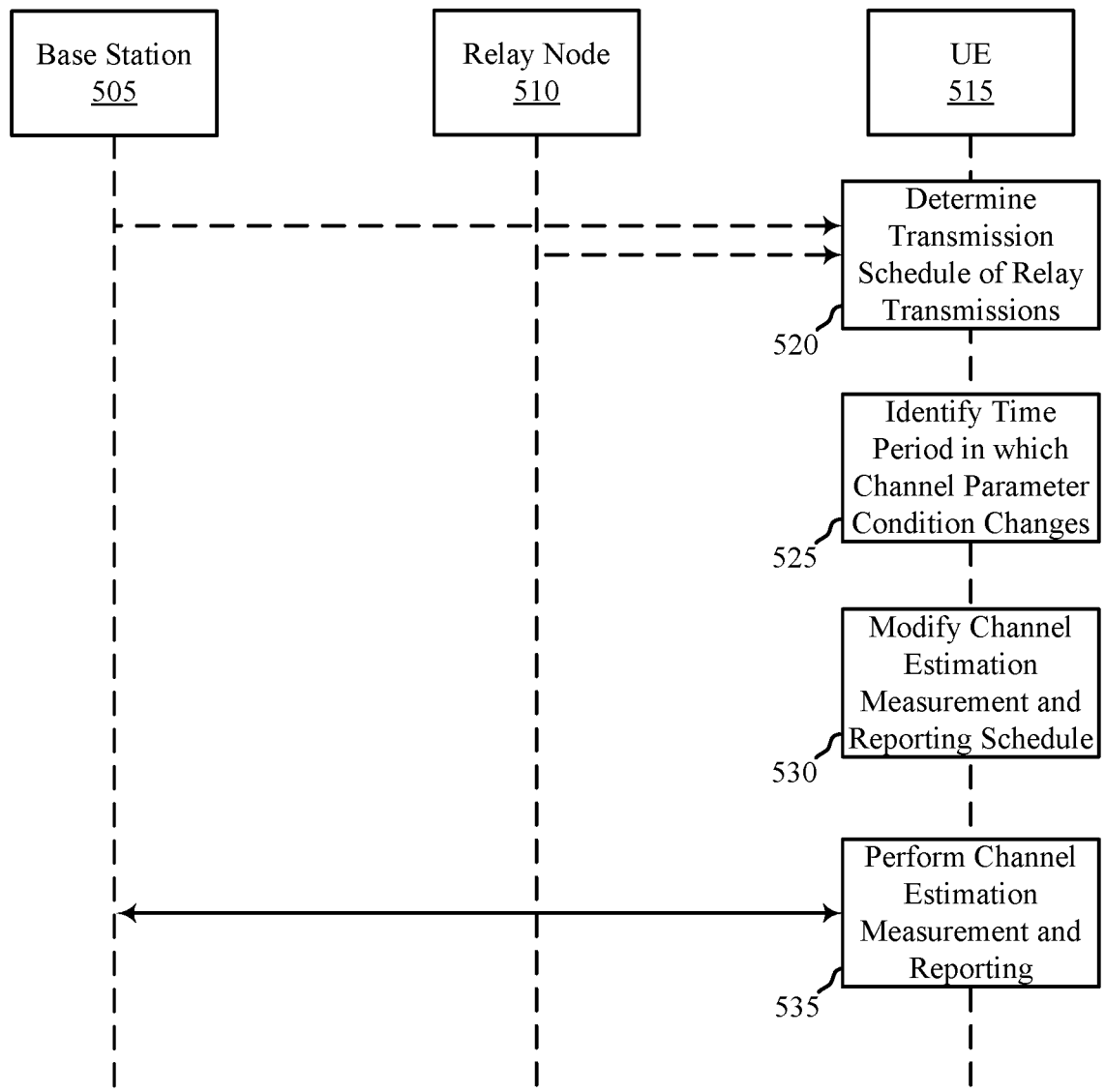
FIG. 5 illustrates an example of a process that supports in-band wireless relay operations in accordance with aspects of the present disclosure.

FIG. 5 illustrates an example of a process 500 that supports in-band wireless relay operations in accordance with aspects of the present disclosure. In some examples, process 500 may implement aspects of wireless communication systems 100 and/or 200, method 300, and/or process 400. Aspects of process 500 may be implemented by base station 505, relay node 510, and/or UE 515, which may be examples of the corresponding devices described herein.

At 520, UE 515 may determine a transmission schedule associated with one or more relay nodes (such as relay node 510) performing relay transmissions on the channel. In some aspects, this may include UE 515 receiving a configuration signal from base station 505 identifying the transmission schedule. Additionally or alternatively, this may include UE 515 monitoring or otherwise detecting one or more transmissions from relay node 510 (and/or other relay nodes), and identifying the transmission schedule according to the detected transmissions.

At 525, UE 515 may identify, based at least in part on the transmission schedule, a time period in which a channel parameter condition changes based on the relay transmissions. In some aspects, this may include UE 515 detecting a ramping up of the relay transmissions on the channel, which may be used to identify the time period.

At 530, UE 515 may modify channel estimation measurement and reporting schedule based on the time period in which the channel parameter condition changes. For example, UE 515 may extend or contract the schedule in which it performs channel estimation measurement and reporting according to the transmission schedule to be responsive to the time period in which the channel parameter condition changes.

Figure 6:
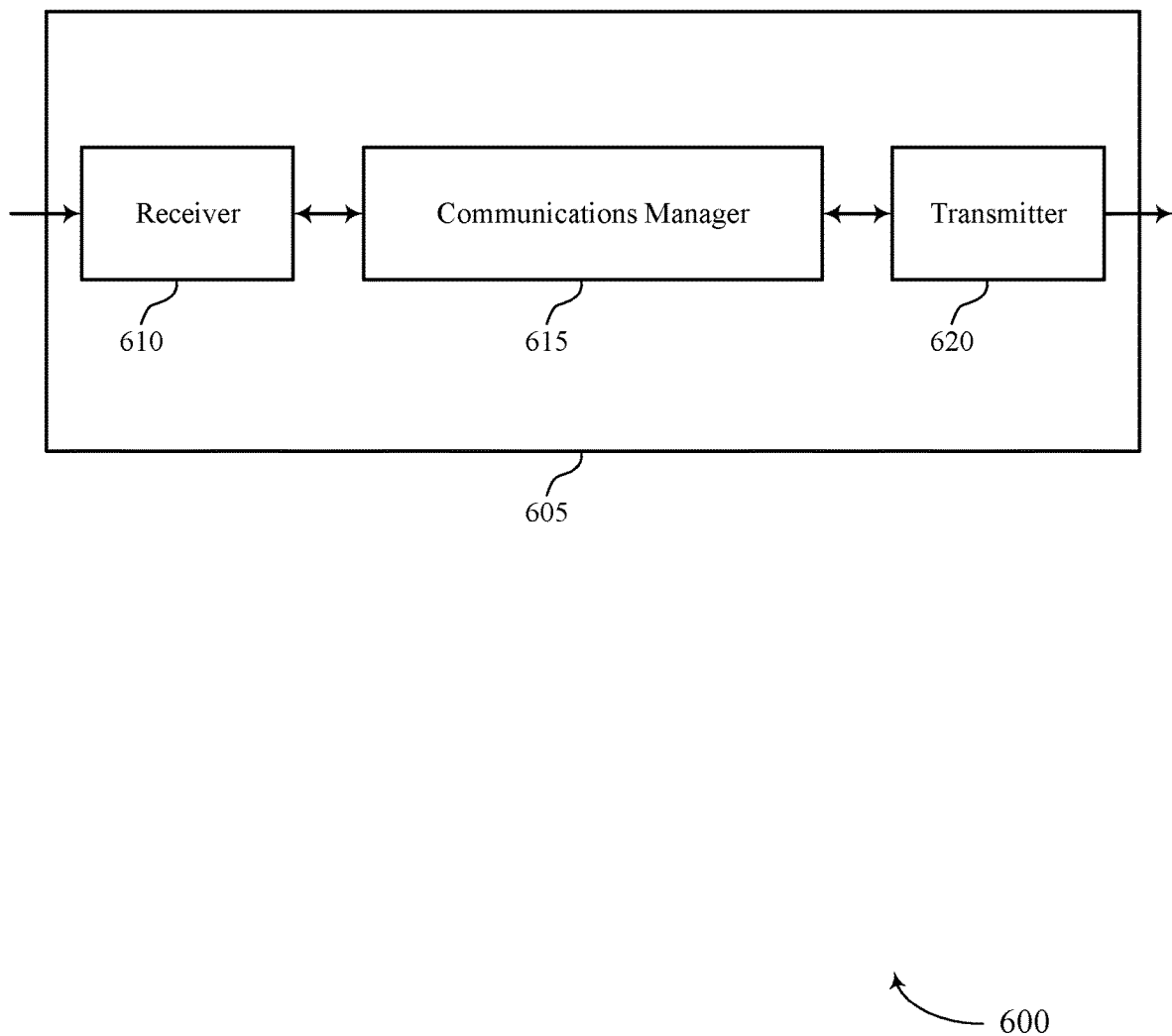
FIGS. 6 and 7 show block diagrams of devices that support in-band wireless relay operations in accordance with aspects of the present disclosure.

FIG. 6 shows a block diagram 600 of a device 605 that supports in-band wireless relay operations in accordance with aspects of the present disclosure. The device 605 may be an example of aspects of a UE 115 and/or a relay node as described herein. That is, in some examples the device 605 may be a UE 115 that is not a relay, or a UE 115 functioning as a relay node, or as a standalone relay node that behaves differently than a UE 115. Accordingly, the device 605 may be an example of a UE 115 and a relay node in some situations. The device 605 may include a receiver 610, a communications manager 615, and a transmitter 620. The device 605 may also include a processor, e.g., at least one processor. Each of these components may be in communication with one another (e.g., via one or more buses).

The receiver 610 may receive information such as packets, user data, or control information associated with various information channels (e.g., control channels, data channels, and information related to in-band wireless relay operations, etc.). Information may be passed on to other components of the device 605. The receiver 610 may be an example of aspects of the transceiver 920 described with reference to FIG. 9. The receiver 610 may utilize a single antenna or a set of antennas.

When device 605 is configured as a relay node, the communications manager 615 may establish a control plane connection between the relay node and a base station, where establishing the control plane connection includes receiving from the base station a first network identifier for the relay node, receive, via the control plane connection, a relay configuration from the base station, monitor grants associated with a set of one or more UEs based on the relay configuration, each UE including a network identifier that is different from the first network identifier, and relay communications between the base station and the set of one or more UEs according to the monitoring.

When device 605 is configured as a UE 115, the communications manager 615 may also determine a transmission schedule associated with one or more relay nodes performing relay transmissions on a channel, identify, based on the transmission schedule, a time period in which a channel parameter condition changes based on the relay transmissions, and modify a channel estimation measurement and reporting schedule based on the time period in which the channel parameter condition changes. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as one or more components of a wireless modem chipset, and the receiver 610 and the transmitter 620 may include analog components (e.g., filters, amplifiers, mixers, phase components, antennas, etc.) that interface with the wireless modem chipset to send and receive signals and messages. In one example, the communications manager 615 may be coupled with the receiver via a first interface and coupled with the transmitter over a second interface. The communications manager 615 may obtain signals received over a wireless channel from the receiver 610 via the first interface, and may output signals to the transmitter 620 via the second interface for transmission over the wireless channel.

Figure 7:
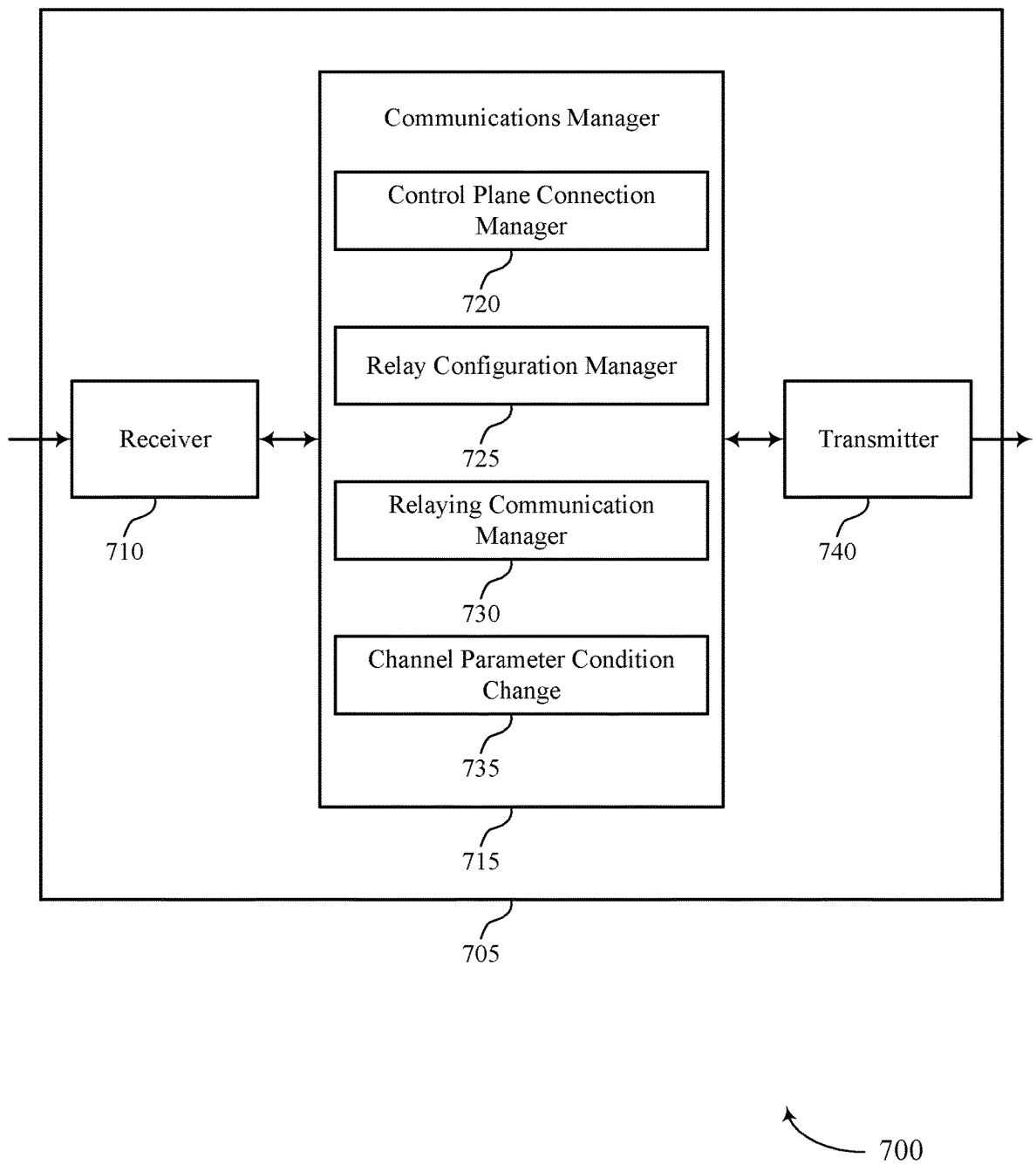

FIG. 7 shows a block diagram 700 of a device 705 that supports in-band wireless relay operations in accordance with aspects of the present disclosure. The device 705 may be an example of aspects of a device 605, or a UE 115, and/or a relay node as described herein. That is, in some aspects the device 705 may be an example of a UE 115, but the UE 115 may be configured or otherwise act as a relay node within a wireless network. Accordingly, the device 705 may be an example of a UE 115 and a relay node in some situations. The device 705 may include a receiver 710, a communications manager 715, and a transmitter 740. The device 705 may also include a processor, e.g., at least one processor. Each of these components may be in communication with one another (e.g., via one or more buses).

The receiver 710 may receive information such as packets, user data, or control information associated with various information channels (e.g., control channels, data channels, and information related to in-band wireless relay operations, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a control plane connection manager 720, a relay configuration manager 725, a relaying communication manager 730, and a channel parameter condition change 735. The communications manager 715 may be an example of aspects of the communications manager 910 described herein.

When device 705 is configured as a relay node, the control plane connection manager 720 may establish a control plane connection between the relay node and a base station, where establishing the control plane connection includes receiving from the base station a first network identifier for the relay node.

When device 705 is configured as a relay node, the relay configuration manager 725 may receive, via the control plane connection, a relay configuration from the base station.

When device 705 is configured as a relay node, the relaying communication manager 730 may monitor grants associated with a set of one or more UEs based on the relay configuration, each UE including a network identifier that is different from the first network identifier and relay communications between the base station and the set of one or more UEs according to the monitoring.

When device 705 is configured as a UE 115, the relaying communication manager 730 may determine a transmission schedule associated with one or more relay nodes performing relay transmissions on a channel.

When device 705 is configured as a UE 115, the channel parameter condition change 735 may identify, based on the transmission schedule, a time period in which a channel parameter condition changes based on the relay transmissions and modify a channel estimation measurement and reporting schedule based on the time period in which the channel parameter condition changes.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
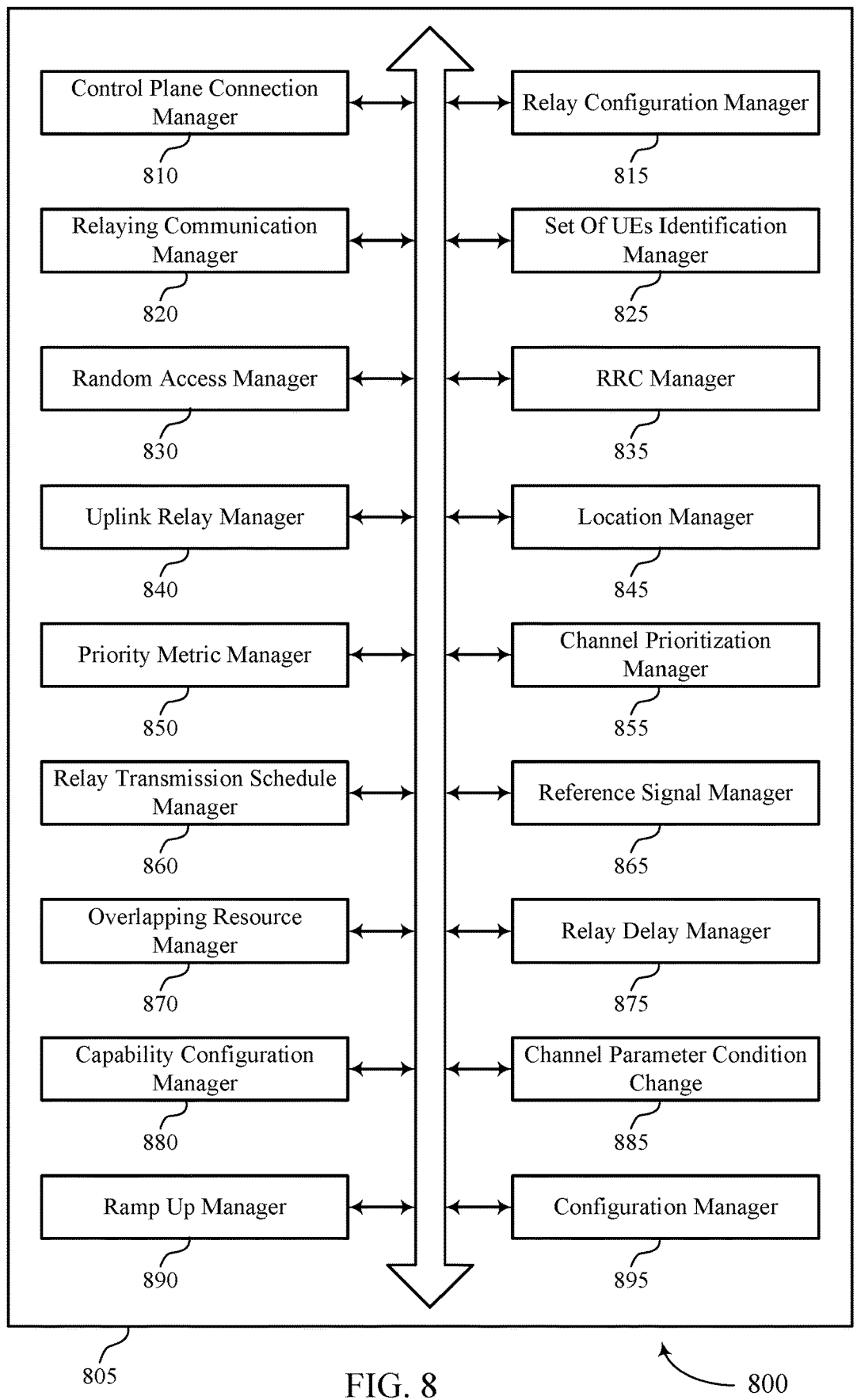
FIG. 8 shows a block diagram of a communications manager that supports in-band wireless relay operations in accordance with aspects of the present disclosure.

FIG. 8 shows a block diagram 800 of a communications manager 805 that supports in-band wireless relay operations in accordance with aspects of the present disclosure. The communications manager 805 may be an example of aspects of a communications manager 615, a communications manager 715, or a communications manager 910 described herein. The communications manager 805 may include a control plane connection manager 810, a relay configuration manager 815, a relaying communication manager 820, a set of UEs identification manager 825, a random access manager 830, a RRC manager 835, an uplink relay manager 840, a location manager 845, a priority metric manager 850, a channel prioritization manager 855, a relay transmission schedule manager 860, a reference signal manager 865, an overlapping resource manager 870, a relay delay manager 875, a capability configuration manager 880, a channel parameter condition change 885, a ramp up manager 890, and a configuration manager 895. Each of these modules may communicate, directly or indirectly, with one another (e.g., via one or more buses).

The control plane connection manager 810 may establish a control plane connection between the relay node and a base station, where establishing the control plane connection includes receiving from the base station a first network identifier for the relay node.

The relay configuration manager 815 may receive, via the control plane connection, a relay configuration from the base station.

The relaying communication manager 820 may monitor grants associated with a set of one or more UEs based on the relay configuration, each UE including a network identifier that is different from the first network identifier. In some examples, the relaying communication manager 820 may relay communications between the base station and the set of one or more UEs according to the monitoring. In some examples, the relaying communication manager 820 may determine a transmission schedule associated with one or more relay nodes performing relay transmissions on a channel. In some examples, the relaying communication manager 820 may ramp up the transmission power of the communications relayed between the base station and the set of one or more UEs.

The channel parameter condition change 885 may identify, based on the transmission schedule, a time period in which a channel parameter condition changes based on the relay transmissions. In some examples, the channel parameter condition change 885 may modify a channel estimation measurement and reporting schedule based on the time period in which the channel parameter condition changes.

The set of UEs identification manager 825 may identify the set of one or more UEs based on each UE within the set of one or more UEs being located within a proximity range of the relay node, or a repetition rate for the relaying communications satisfying a threshold value, or a combination thereof. In some examples, the set of UEs identification manager 825 may receive a signal via the control plane connection identifying the set of one or more UEs. In some examples, the set of UEs identification manager 825 may receive transmissions from each UE within the set of one or more UEs, where the set of one or more UEs is identified based on the received transmissions. In some cases, the relay configuration identifies the set of one or more UEs.

The random access manager 830 may receive a random access request from at least one UE in the set of one or more UEs, where monitoring the grants is based on the random access request. In some examples, the random access manager 830 may determine that a receive power level of the random access request satisfies a threshold, or that the relay transmissions associated with the random access request include a repetition rate satisfying a threshold value, or a combination thereof. In some examples, the random access manager 830 may relay the random access request to the base station. In some examples, the random access manager 830 may receive a random access response from the base station. In some examples, the random access manager 830 may relay the random access response to the at least one UE, where monitoring the grants is based on the random access response.

The RRC manager 835 may receive a radio resource control configuration for the set of one or more UEs, where relaying communications between the base station and the set of one or more UEs is based on the radio resource control configuration. In some cases, the radio resource control configuration is received via at least one of the control plane connection, or a MAC CE, or a combination thereof.

The uplink relay manager 840 may receive an uplink transmission from each UE in the set of one or more UEs. In some examples, the uplink relay manager 840 may determine, based on the uplink transmission, a channel performance metric associated with each UE. In some examples, the uplink relay manager 840 may transmit a channel performance feedback report to the base station identifying the channel performance metric associated with each UE.

The location manager 845 may transmit a signal to the base station identifying a location of the relay node, where the set of one or more UEs is based on the location of the relay node and a proximity range between each UE in the set of one or more UEs and the relay node satisfying a threshold.

The priority metric manager 850 may identify a first priority metric for relaying communications between the base station and the set of one or more UEs and a second priority metric for performing communications between the base station and the relay node, where relaying communications between the base station and the set of one or more UEs is based on the first priority metric being a higher priority metric than the second priority metric.

The channel prioritization manager 855 may monitor, based on the relay configuration, a control signal identifying scheduling information for a corresponding data signal. In some examples, the channel prioritization manager 855 may determine to relay communications between the base station and the set of one or more UEs based on a transmission configuration for the control signal or the data signal. In some examples, the channel prioritization manager 855 may decode at least a portion of the control signal to identify the scheduling information for the corresponding data signal.

In some examples, the channel prioritization manager 855 may decode, based on the decoded portion of the control signal, at least a portion of the corresponding data signal. In some examples, the channel prioritization manager 855 may determine to relay communications between the base station and the set of one or more UEs based on the transmission configuration for the control signal, or the corresponding data signal, or a combination thereof.

The relay transmission schedule manager 860 may identify a transmission schedule associated with relaying communications between the base station and the set of one or more UEs, where the relaying is performed according to the transmission schedule. In some cases, the transmission schedule includes a set of starting points for relaying communications, and where relaying communications is scheduled to start in at least one starting point of the set of starting points.

The reference signal manager 865 may determine that at least one of the communications is received with a corresponding type of reference signal used for decoding the at least one communication. In some examples, the reference signal manager 865 may determine whether to relay or refrain from relaying the at least one communication between the base station and the set of one or more UEs based on the corresponding type of reference signal. In some examples, determining that the corresponding type of reference signal includes a DMRS.

In some examples, the reference signal manager 865 may determine to relay the at least one communication between the base station and the set of one or more based on the DMRS. In some examples, determining that the corresponding type of reference signal includes a CRS. In some examples, the reference signal manager 865 may determine not to relay the at least one communication between the base station and the set of one or more based on the CRS. In some examples, the reference signal manager 865 may refrain, based on a corresponding reference signal, from relaying the at least one of the communications between the base station and the set of one or more UEs.

The overlapping resource manager 870 may determine that at least one of the communications is scheduled on overlapping resources used by the set of one or more UEs for performing channel performance measurement and reporting with the base station. In some examples, the overlapping resource manager 870 may refrain, based on the overlapping resources, from relaying the at least one of the communications between the base station and the set of one or more UEs.

The relay delay manager 875 may delay, based on a delay configuration, relaying communications between the base station and the set of one or more UEs, where the delay configuration is based on a repetition factor for the communications between the base station and the set of one or more UEs.

The capability configuration manager 880 may transmit a capability configuration to the base station identifying a count value of UE that the relay node is capable of monitoring, where the set of one or more UEs is based on the capability configuration.

The ramp up manager 890 may detect a ramp up of the relay transmissions on the channel, where the time period is identified based on the detected ramp up of the relay transmissions.

The configuration manager 895 may receive, from a base station, a configuration signal identifying the transmission schedule.

Figure 9:
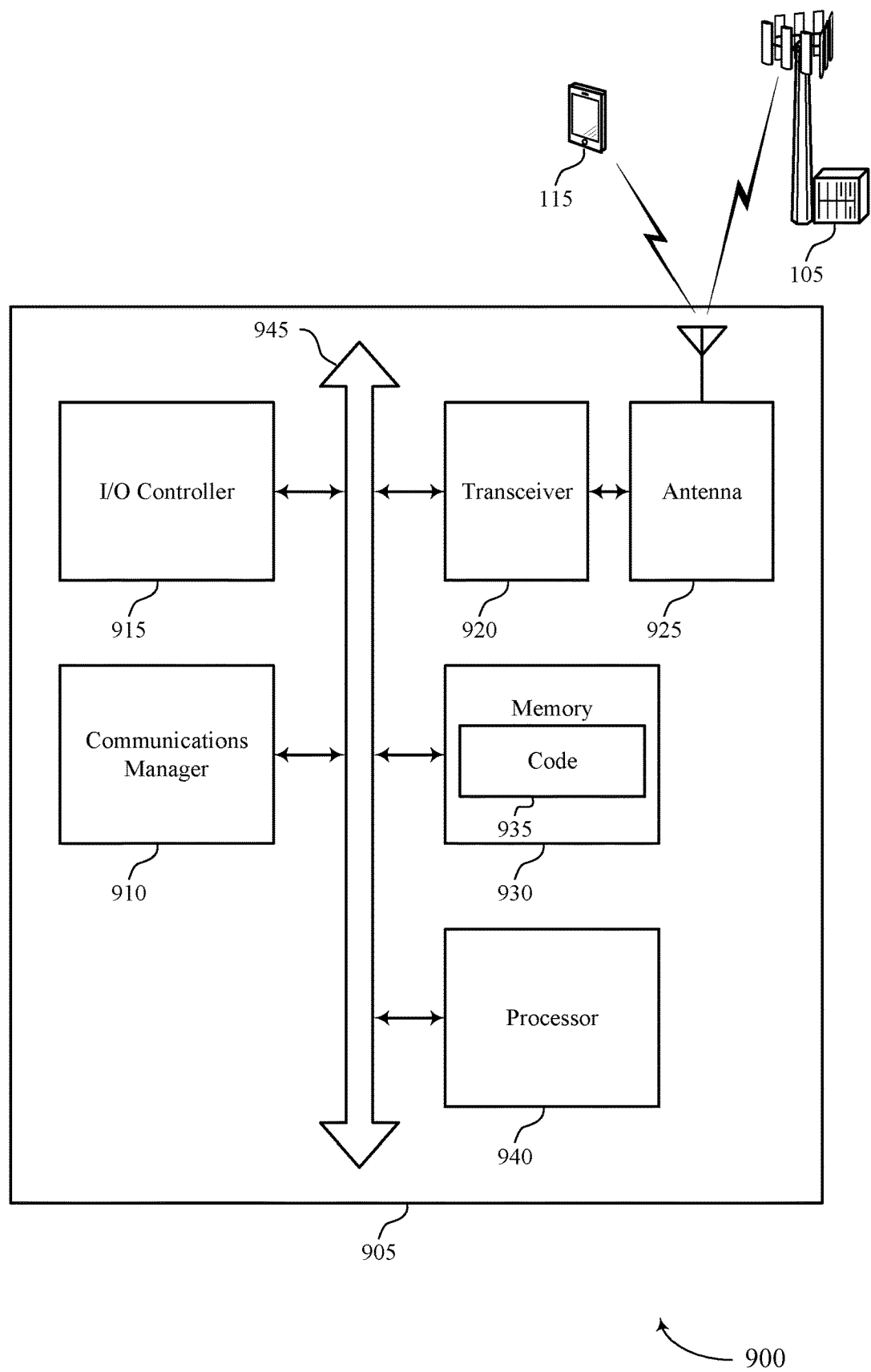
FIG. 9 shows a diagram of a system including a device that supports in-band wireless relay operations in accordance with aspects of the present disclosure.

FIG. 9 shows a diagram of a system 900 including a device 905 that supports in-band wireless relay operations in accordance with aspects of the present disclosure. The device 905 may be an example of or include the components of device 605, device 705, a UE 115, and/or a relay node as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

When device 905 is configured as a relay node, the communications manager 910 may establish a control plane connection between the relay node and a base station, where establishing the control plane connection includes receiving from the base station a first network identifier for the relay node, receive, via the control plane connection, a relay configuration from the base station, monitor grants associated with a set of one or more UEs based on the relay configuration, each UE including a network identifier that is different from the first network identifier, and relay communications between the base station and the set of one or more UEs according to the monitoring.

When device 905 is configured as a UE 115, the communications manager 910 may also determine a transmission schedule associated with one or more relay nodes performing relay transmissions on a channel, identify, based on the transmission schedule, a time period in which a channel parameter condition changes based on the relay transmissions, and modify a channel estimation measurement and reporting schedule based on the time period in which the channel parameter condition changes.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as discussed herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting in-band wireless relay operations).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
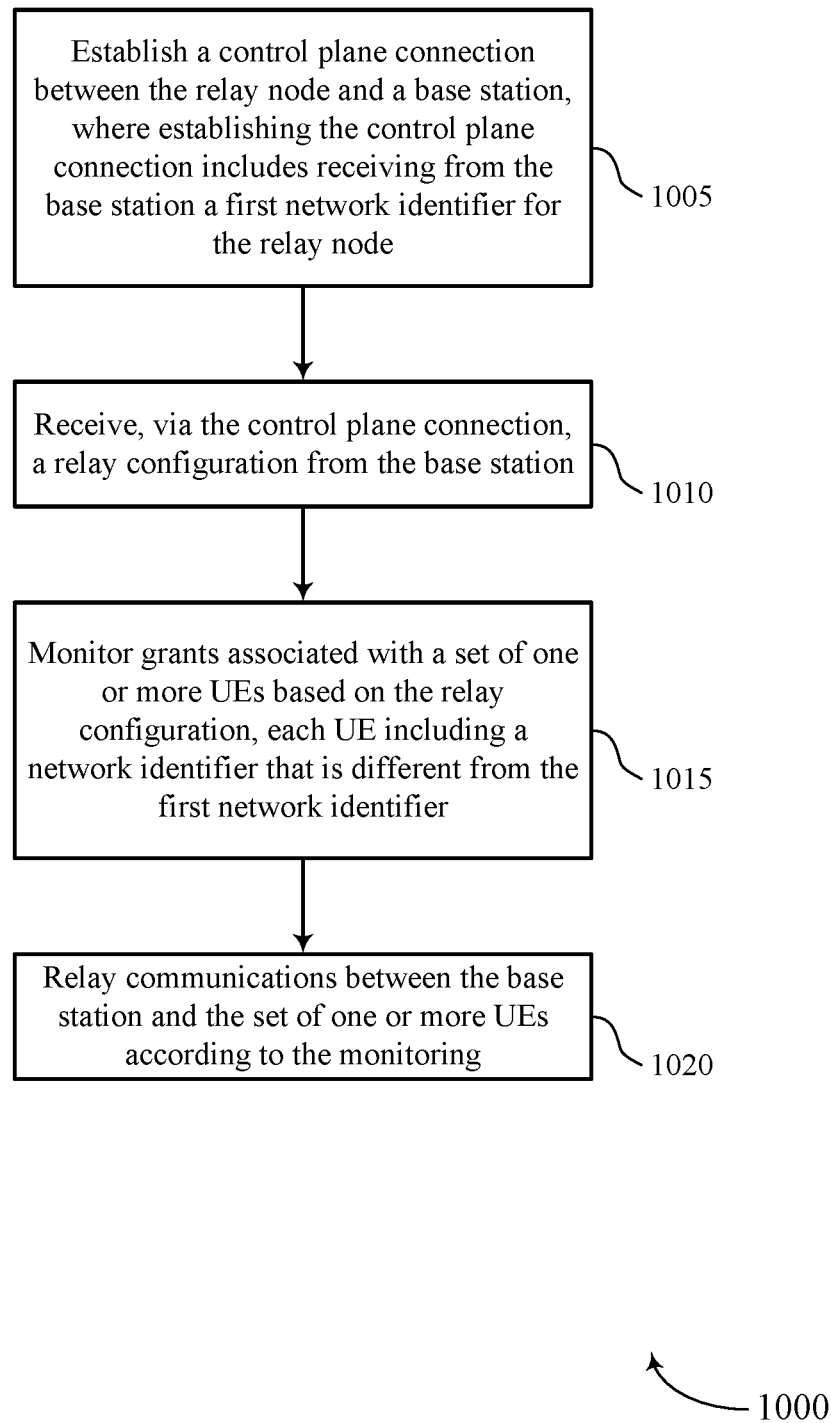
FIGS. 10 through 14 show flowcharts illustrating methods that support in-band wireless relay operations in accordance with aspects of the present disclosure.

FIG. 10 shows a flowchart illustrating a method 1000 that supports in-band wireless relay operations in accordance with aspects of the present disclosure. The operations of method 1000 may be implemented by a UE 115 (e.g., a UE 115 configured as a relay node) or its components as described herein. For example, the operations of method 1000 may be performed by a communications manager as described with reference to FIGS. 6 through 9. In some examples, a relay node may execute a set of instructions to control the functional elements of the relay node to perform the functions discussed herein. Additionally or alternatively, a relay node may perform aspects of the functions discussed herein using special-purpose hardware.

At 1005, the relay node may establish a control plane connection between the relay node and a base station, where establishing the control plane connection includes receiving from the base station a first network identifier for the relay node. The operations of 1005 may be performed according to the methods described herein. In some examples, aspects of the operations of 1005 may be performed by a control plane connection manager as described with reference to FIGS. 6 through 9.

At 1010, the relay node may receive, via the control plane connection, a relay configuration from the base station. The operations of 1010 may be performed according to the methods described herein. In some examples, aspects of the operations of 1010 may be performed by a relay configuration manager as described with reference to FIGS. 6 through 9.

At 1015, the relay node may monitor grants associated with a set of one or more UEs based on the relay configuration, each UE including a network identifier that is different from the first network identifier. The operations of 1015 may be performed according to the methods described herein. In some examples, aspects of the operations of 1015 may be performed by a relaying communication manager as described with reference to FIGS. 6 through 9.

At 1020, the relay node may relay communications between the base station and the set of one or more UEs according to the monitoring. The operations of 1020 may be performed according to the methods described herein. In some examples, aspects of the operations of 1020 may be performed by a relaying communication manager as described with reference to FIGS. 6 through 9.

Figure 11:
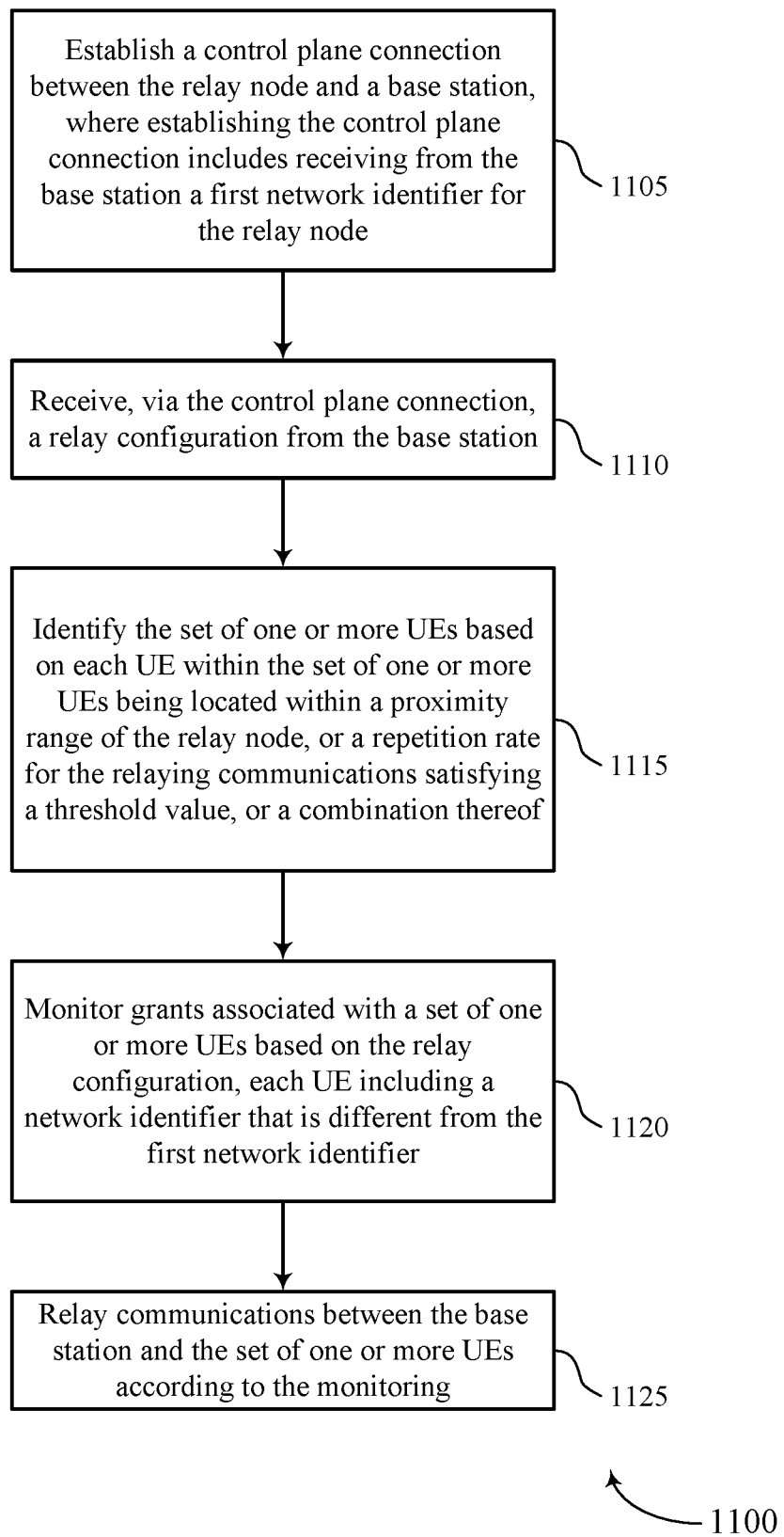

FIG. 11 shows a flowchart illustrating a method 1100 that supports in-band wireless relay operations in accordance with aspects of the present disclosure. The operations of method 1100 may be implemented by a UE 115 (e.g., a UE 115 configured as a relay node) or its components as described herein. For example, the operations of method 1100 may be performed by a communications manager as described with reference to FIGS. 6 through 9. In some examples, a relay node may execute a set of instructions to control the functional elements of the relay node to perform the functions discussed herein. Additionally or alternatively, a relay node may perform aspects of the functions discussed herein using special-purpose hardware.

At 1105, the relay node may establish a control plane connection between the relay node and a base station, where establishing the control plane connection includes receiving from the base station a first network identifier for the relay node. The operations of 1105 may be performed according to the methods described herein. In some examples, aspects of the operations of 1105 may be performed by a control plane connection manager as described with reference to FIGS. 6 through 9.

At 1110, the relay node may receive, via the control plane connection, a relay configuration from the base station. The operations of 1110 may be performed according to the methods described herein. In some examples, aspects of the operations of 1110 may be performed by a relay configuration manager as described with reference to FIGS. 6 through 9.

At 1115, the relay node may identify the set of one or more UEs based on each UE within the set of one or more UEs being located within a proximity range of the relay node, or a repetition rate for the relaying communications satisfying a threshold value, or a combination thereof. The operations of 1115 may be performed according to the methods described herein. In some examples, aspects of the operations of 1115 may be performed by a set of UEs identification manager as described with reference to FIGS. 6 through 9.

At 1120, the relay node may monitor grants associated with a set of one or more UEs based on the relay configuration, each UE including a network identifier that is different from the first network identifier. The operations of 1120 may be performed according to the methods described herein. In some examples, aspects of the operations of 1120 may be performed by a relaying communication manager as described with reference to FIGS. 6 through 9.

At 1125, the relay node may relay communications between the base station and the set of one or more UEs according to the monitoring. The operations of 1125 may be performed according to the methods described herein. In some examples, aspects of the operations of 1125 may be performed by a relaying communication manager as described with reference to FIGS. 6 through 9.

Figure 12:
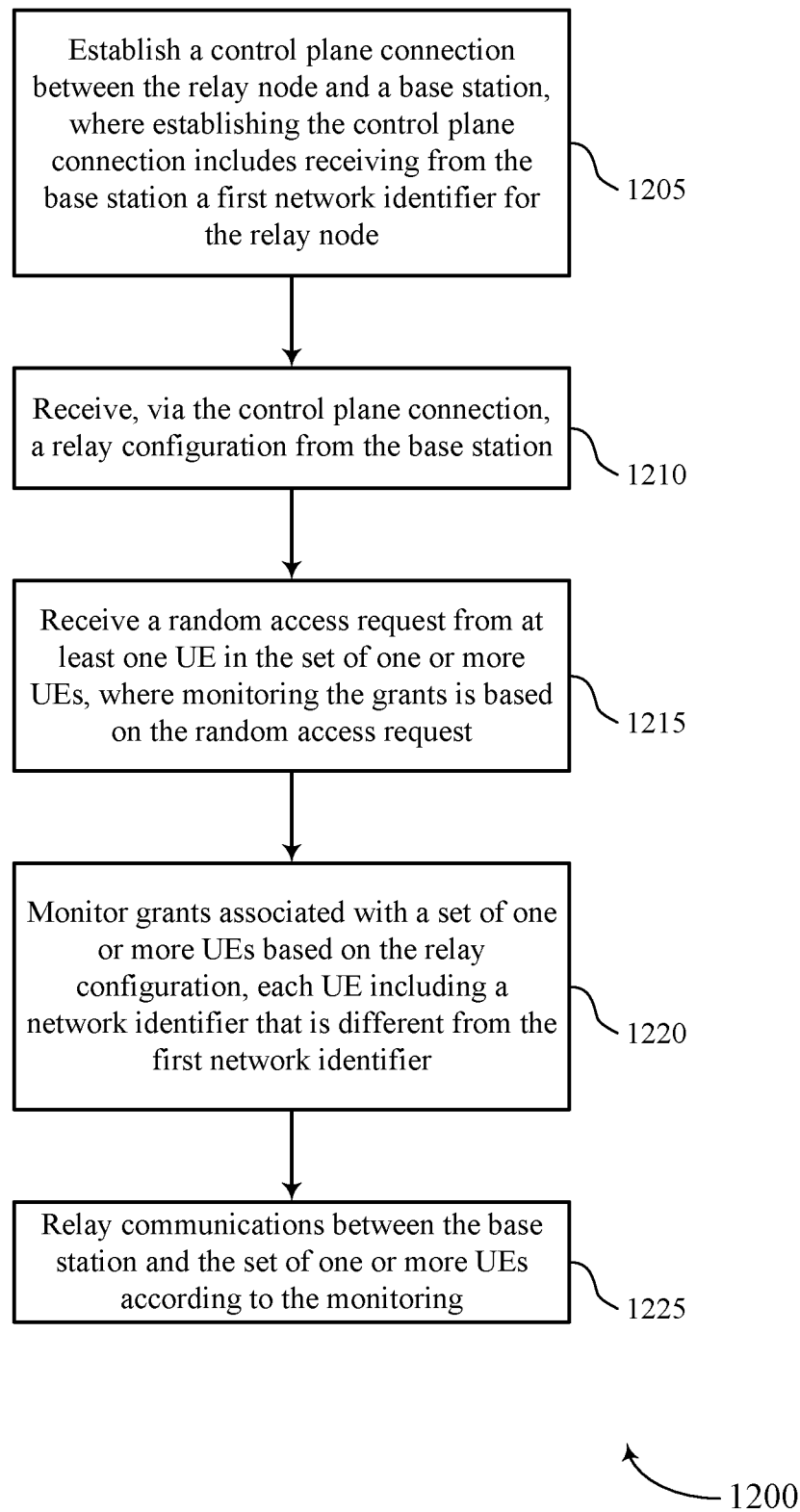

FIG. 12 shows a flowchart illustrating a method 1200 that supports in-band wireless relay operations in accordance with aspects of the present disclosure. The operations of method 1200 may be implemented by a UE 115 (e.g., a UE 115 configured as a relay node) or its components as described herein. For example, the operations of method 1200 may be performed by a communications manager as described with reference to FIGS. 6 through 9. In some examples, a relay node may execute a set of instructions to control the functional elements of the relay node to perform the functions discussed herein. Additionally or alternatively, a relay node may perform aspects of the functions discussed herein using special-purpose hardware.

At 1205, the relay node may establish a control plane connection between the relay node and a base station, where establishing the control plane connection includes receiving from the base station a first network identifier for the relay node. The operations of 1205 may be performed according to the methods described herein. In some examples, aspects of the operations of 1205 may be performed by a control plane connection manager as described with reference to FIGS. 6 through 9.

At 1210, the relay node may receive, via the control plane connection, a relay configuration from the base station. The operations of 1210 may be performed according to the methods described herein. In some examples, aspects of the operations of 1210 may be performed by a relay configuration manager as described with reference to FIGS. 6 through 9.

At 1215, the relay node may receive a random access request from at least one UE in the set of one or more UEs, where monitoring the grants is based on the random access request. The operations of 1215 may be performed according to the methods described herein. In some examples, aspects of the operations of 1215 may be performed by a random access manager as described with reference to FIGS. 6 through 9.

At 1220, the relay node may monitor grants associated with a set of one or more UEs based on the relay configuration, each UE including a network identifier that is different from the first network identifier. The operations of 1220 may be performed according to the methods described herein. In some examples, aspects of the operations of 1220 may be performed by a relaying communication manager as described with reference to FIGS. 6 through 9.

At 1225, the relay node may relay communications between the base station and the set of one or more UEs according to the monitoring. The operations of 1225 may be performed according to the methods described herein. In some examples, aspects of the operations of 1225 may be performed by a relaying communication manager as described with reference to FIGS. 6 through 9.

Figure 13:
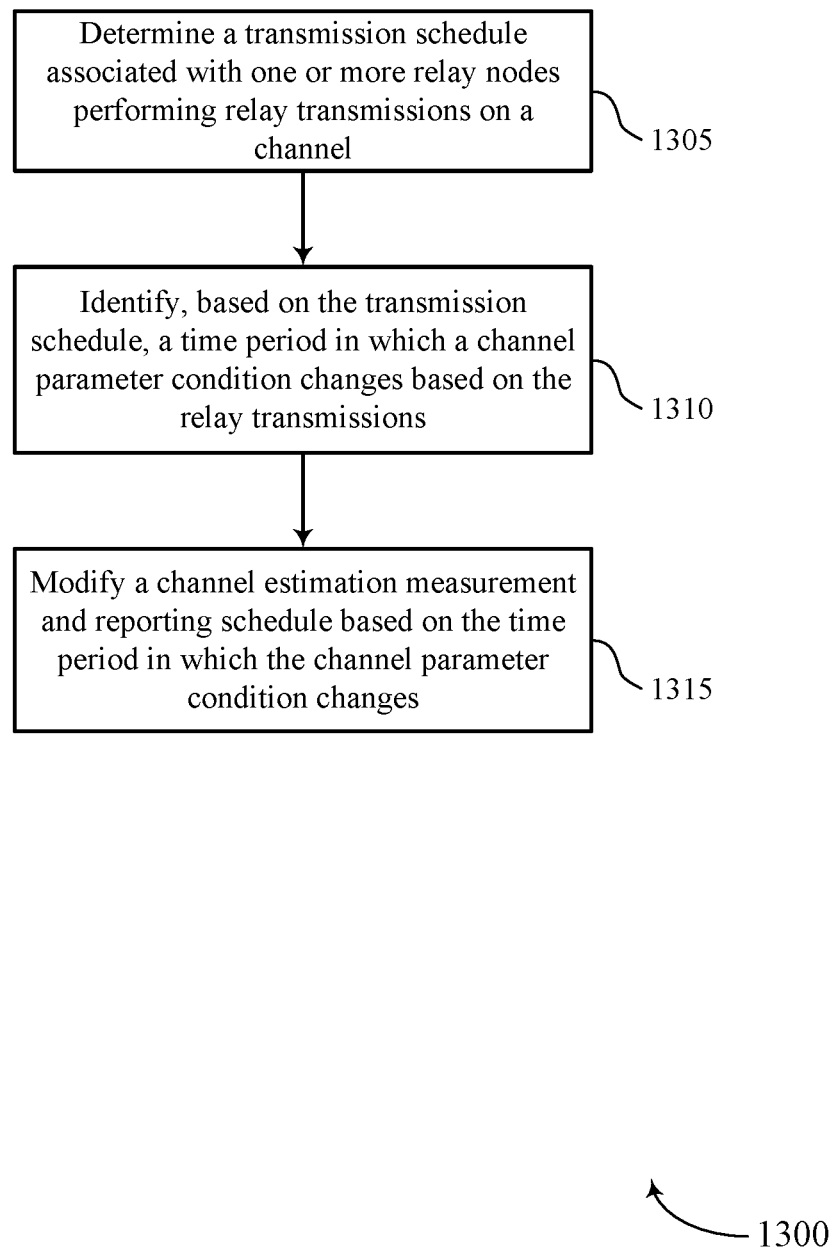

FIG. 13 shows a flowchart illustrating a method 1300 that supports in-band wireless relay operations in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions discussed herein. Additionally or alternatively, a UE may perform aspects of the functions discussed herein using special-purpose hardware.

At 1305, the UE may determine a transmission schedule associated with one or more relay nodes performing relay transmissions on a channel. The operations of 1305 may be performed according to the methods described herein. In some examples, aspects of the operations of 1305 may be performed by a relaying communication manager as described with reference to FIGS. 6 through 9.

At 1310, the UE may identify, based on the transmission schedule, a time period in which a channel parameter condition changes based on the relay transmissions. The operations of 1310 may be performed according to the methods described herein. In some examples, aspects of the operations of 1310 may be performed by a channel parameter condition change as described with reference to FIGS. 6 through 9.

At 1315, the UE may modify a channel estimation measurement and reporting schedule based on the time period in which the channel parameter condition changes. The operations of 1315 may be performed according to the methods described herein. In some examples, aspects of the operations of 1315 may be performed by a channel parameter condition change as described with reference to FIGS. 6 through 9.

Figure 14:
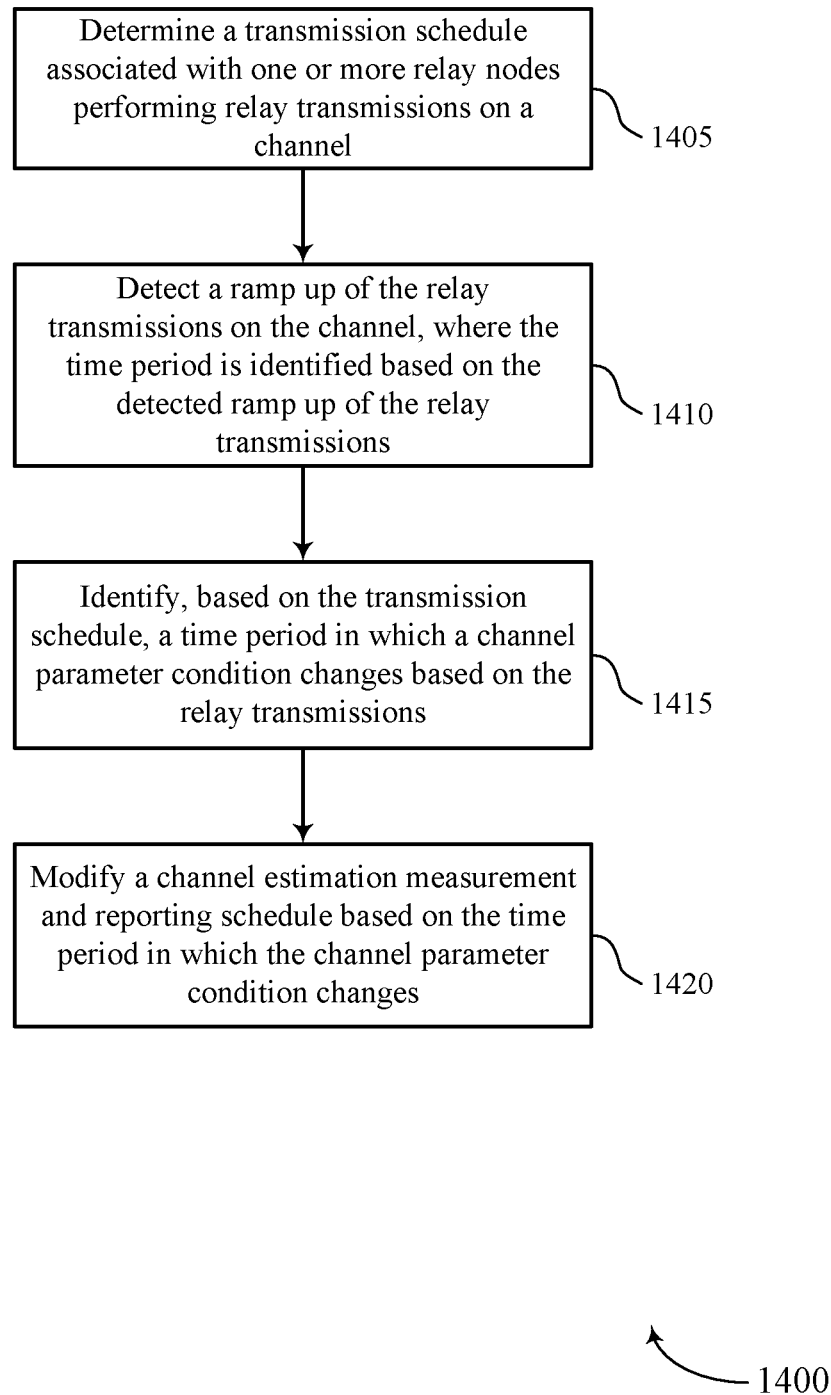

FIG. 14 shows a flowchart illustrating a method 1400 that supports in-band wireless relay operations in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions discussed herein. Additionally or alternatively, a UE may perform aspects of the functions discussed herein using special-purpose hardware.

At 1405, the UE may determine a transmission schedule associated with one or more relay nodes performing relay transmissions on a channel. The operations of 1405 may be performed according to the methods described herein. In some examples, aspects of the operations of 1405 may be performed by a relaying communication manager as described with reference to FIGS. 6 through 9.

At 1410, the UE may detect a ramp up of the relay transmissions on the channel, where the time period is identified based on the detected ramp up of the relay transmissions. The operations of 1410 may be performed according to the methods described herein. In some examples, aspects of the operations of 1410 may be performed by a ramp up manager as described with reference to FIGS. 6 through 9.

At 1415, the UE may identify, based on the transmission schedule, a time period in which a channel parameter condition changes based on the relay transmissions. The operations of 1415 may be performed according to the methods described herein. In some examples, aspects of the operations of 1415 may be performed by a channel parameter condition change as described with reference to FIGS. 6 through 9.

At 1420, the UE may modify a channel estimation measurement and reporting schedule based on the time period in which the channel parameter condition changes. The operations of 1420 may be performed according to the methods described herein. In some examples, aspects of the operations of 1420 may be performed by a channel parameter condition change as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1 X, 1 X, etc. IS-856 (TIA-856) is commonly referred to as CDMA2000 1 xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor(s), controller(s), microcontroller(s), or state machine(s). A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a relay node, comprising:
   establishing a control plane connection between the relay node and a network device, wherein establishing the control plane connection comprises receiving from the network device a first network identifier for the relay node;
   receiving, via the control plane connection, a relay configuration from the network device;
   receiving uplink transmissions from each user equipment (UE) within a subset of one or more UEs, the subset of one or more UEs being associated with relay operations with the relay node from a set of UEs served by the network device, wherein the subset of one or more UEs is identified from the set of UEs based at least in part on the received uplink transmissions;

monitoring grants associated with the subset of one or more UEs based at least in part on the relay configuration, the received uplink transmissions, and a received power level of the received uplink transmissions satisfying a threshold, wherein each UE within the subset of one or more UEs comprises a network identifier that is different from the first network identifier; and relaying communications between the network device and the subset of one or more UEs according to the monitoring.

2. The method of claim 1, further comprising:
identifying the subset of one or more UEs based at least in part on each UE within the subset of one or more UEs being located within a proximity range of the relay node, or a repetition rate for the relayed communications satisfying a threshold value, or a combination thereof.

3. The method of claim 2, wherein the relay configuration identifies the subset of one or more UEs.

4. The method of claim 2, further comprising:
receiving a signal via the control plane connection identifying the subset of one or more UEs.

5. The method of claim 1, wherein receiving the uplink transmissions comprises:
receiving a random access request from at least one UE in the subset of one or more UEs, wherein monitoring the grants is based at least in part on the random access request, and wherein the uplink transmissions comprise the random access request.

6. The method of claim 5, wherein receiving the random access request comprises:
determining relay transmissions associated with the random access request comprise a repetition rate satisfying a threshold value.

7. The method of claim 5, further comprising:
relaying the random access request to the network device;
receiving a random access response from the network device; and
relaying the random access response to the at least one UE, wherein monitoring the grants is based at least in part on the random access response.

8. The method of claim 1, further comprising:
receiving a radio resource control configuration for the subset of one or more UEs, wherein relaying the communications between the network device and the subset of one or more UEs is based at least in part on the radio resource control configuration.

9. The method of claim 8, wherein the radio resource control configuration is received via at least one of the control plane connection, or a medium access control (MAC) control element (CE), or a combination thereof.

10. The method of claim 1, further comprising:
determining, based at least in part on the uplink transmissions received from each UE within the subset of one or more UEs, a channel performance metric associated with each UE; and
transmitting a channel performance feedback report to the network device identifying the channel performance metric associated with each UE.

11. The method of claim 1, further comprising:
transmitting a signal to the network device identifying a location of the relay node, wherein the subset of one or more UEs is based at least in part on the location of the relay node and a proximity range between each UE in the subset of one or more UEs and the relay node satisfying a threshold.

12. The method of claim 1, further comprising:
identifying a first priority metric for relaying the communications between the network device and the subset of one or more UEs and a second priority metric for performing communications between the network device and the relay node, wherein relaying the communications between the network device and the subset of one or more UEs is based at least in part on the first priority metric being a higher priority metric than the second priority metric.

13. The method of claim 1, further comprising:
monitoring, based at least in part on the relay configuration, a control signal identifying scheduling information for a corresponding data signal; and
determining to relay the communications between the network device and the subset of one or more UEs based at least in part on a transmission configuration for the control signal or the corresponding data signal.

14. The method of claim 13, further comprising:
decoding at least a portion of the control signal to identify the scheduling information for the corresponding data signal;
decoding, based at least in part on the decoded portion of the control signal, at least a portion of the corresponding data signal; and
determining to relay the communications between the network device and the subset of one or more UEs based at least in part on the transmission configuration for the control signal, or the corresponding data signal, or a combination thereof.

15. The method of claim 1, further comprising:
identifying a transmission schedule associated with relaying the communications between the network device and the subset of one or more UEs, wherein the relaying is performed according to the transmission schedule.

16. The method of claim 15, wherein the transmission schedule comprises a set of starting points for relaying the communications, and wherein relaying communications is scheduled to start in at least one starting point of the set of starting points.

17. The method of claim 1, wherein relaying the communications between the network device and the subset of one or more UEs comprises:
ramping up a transmission power of the communications relayed between the network device and the subset of one or more UEs.

18. The method of claim 1, further comprising:
determining that at least one of the communications is received with a corresponding type of reference signal used for decoding the at least one communication; and
determining whether to relay or refrain from relaying the at least one communication between the network device and the subset of one or more UEs based at least in part on the corresponding type of the reference signal.

19. The method of claim 18, further comprising:
determining that the corresponding type of the reference signal comprises a demodulation reference signal (DMRS); and
determining to relay the at least one communication between the network device and the subset of one or more UEs based at least in part on the DMRS.

20. The method of claim 18, further comprising:
determining that the corresponding type of the reference signal comprises a cell-specific reference signal (CRS); and determining not to relay the at least one communication between the network device and the subset of one or more UEs based at least in part on the CRS.

21. The method of claim 1, further comprising:
determining that at least one of the communications is scheduled on overlapping resources used by the subset of one or more UEs for performing channel performance measurement and reporting with the network device; and
refraining, based at least in part on the overlapping resources, from relaying the at least one of the communications between the network device and the subset of one or more UEs.

22. The method of claim 1, further comprising:
delaying, based at least in part on a delay configuration, relaying the communications between the network device and the subset of one or more UEs, wherein the delay configuration is based at least in part on a repetition factor for the communications between the network device and the subset of one or more UEs.

23. The method of claim 1, further comprising:
refraining, based at least in part on a corresponding reference signal, from relaying at least one of the communications between the network device and the subset of one or more UEs.

24. The method of claim 1, further comprising:
transmitting a capability configuration to the network device identifying a count value of UE that the relay node is capable of monitoring, wherein the subset of one or more UEs is based at least in part on the capability configuration.

25. A relay node for wireless communication, comprising:
one or more memories storing processor-executable code; and
one or more processors coupled with the one or more memories and individually or collectively operable to execute the code to cause the relay node to:
establish a control plane connection between the relay node and a network device, wherein establishing the control plane connection comprises receiving from the network device a first network identifier for the relay node;
receive, via the control plane connection, a relay configuration from the network device;
receive uplink transmissions from each user equipment (UE) within a subset of one or more UEs, the subset of one or more UEs being associated with relay operations with the relay node from a set of UEs served by the network device, wherein the subset of one or more UEs is identified from the set of UEs based at least in part on the received uplink transmissions;
monitor grants associated with the subset of one or more UEs based at least in part on the relay configuration, the received uplink transmissions, and a received power level of the received uplink transmissions satisfying a threshold, wherein each UE within the subset of one or more UEs comprising a network identifier that is different from the first network identifier; and
relay communications between the network device and the subset of one or more UEs according to the monitoring.

26. The relay node of claim 25, wherein the one or more processors are individually or collectively further operable to execute the code to cause the relay node to:
identify the subset of one or more UEs based at least in part on each UE within the subset of one or more UEs being located within a proximity range of the relay node, or a repetition rate for the relayed communications satisfying a threshold value, or a combination thereof.

27. The relay node of claim 26, wherein the relay configuration identifies the subset of one or more UEs.

28. The relay node of claim 26, wherein the one or more processors are individually or collectively further operable to execute the code to cause the relay node to:
receive a signal via the control plane connection identifying the subset of one or more UEs.

* * * * *